(12) United States Patent
Reid

(10) Patent No.: US 9,081,564 B2
(45) Date of Patent: Jul. 14, 2015

(54) CONVERTING SCALAR OPERATION TO SPECIFIC TYPE OF VECTOR OPERATION USING MODIFIER INSTRUCTION

(75) Inventor: Alastair David Reid, Fulbourn (GB)

(73) Assignee: ARM Limited, Cambridge (GB)

( * ) Notice: Subject to any disclaimer, the term of this patent is extended or adjusted under 35 U.S.C. 154(b) by 590 days.

(21) Appl. No.: 13/439,161

(22) Filed: Apr. 4, 2012

(65) Prior Publication Data

US 2012/0260061 A1 Oct. 11, 2012

(30) Foreign Application Priority Data

Apr. 4, 2011 (GB) .................................. 1105667.8

(51) Int. Cl.
*G06F 9/30* (2006.01)
*G06F 15/80* (2006.01)

(52) U.S. Cl.
CPC .......... *G06F 9/30189* (2013.01); *G06F 9/3013* (2013.01); *G06F 9/30109* (2013.01); *G06F 15/8076* (2013.01)

(58) Field of Classification Search
None
See application file for complete search history.

(56) References Cited

U.S. PATENT DOCUMENTS

| 5,537,606 A | 7/1996 | Byrne |
| 5,561,808 A * | 10/1996 | Kuma et al. ........................ 712/3 |
| 8,010,953 B2 * | 8/2011 | Gschwind ..................... 717/149 |
| 2004/0162965 A1 | 8/2004 | Ogawa et al. |
| 2006/0149941 A1 | 7/2006 | Colavin et al. |
| 2006/0190700 A1 * | 8/2006 | Altman et al. ..................... 712/7 |
| 2011/0072238 A1 | 3/2011 | Mimar |

FOREIGN PATENT DOCUMENTS

| GB | 2 136 172 | 9/1984 |
| WO | WO 02/37264 | 5/2002 |

OTHER PUBLICATIONS

International Search Report and Written Opinion of the International Searching Authority mailed Jun. 18, 2012 in PCT/GB2012/050522.
Fujitsu Limited, "SPARC64™ VIIIfx Extensions" Ver 15, Apr. 2010, 358 pages.
Search Report for UK 1105667.8 dated Aug. 4, 2011.

* cited by examiner

*Primary Examiner* — Kenneth Kim
(74) *Attorney, Agent, or Firm* — Nixon & Vanderhye P.C.

(57) ABSTRACT

A data processing apparatus having processing circuitry, a scalar register bank and a vector register bank, including decoding circuitry arranged to decode a sequence of instructions to generate control signals for the processing circuitry. The decoding circuitry is responsive to a decode modifier instruction within the sequence of instructions to alter decoding of a subsequent scalar instruction in the sequence by mapping at least one scalar operand specified by the subsequent scalar instruction to at least one vector operand in the vector register bank, and, in dependence on the scalar operation specified by the subsequent scalar instruction, determining a vector operation to be performed on at least a subset of the operand elements within the at least the one vector operand. Such an approach enables a wide variety of vector operations to be specified without the need to individually define separate vector instructions for those vector operations.

25 Claims, 13 Drawing Sheets

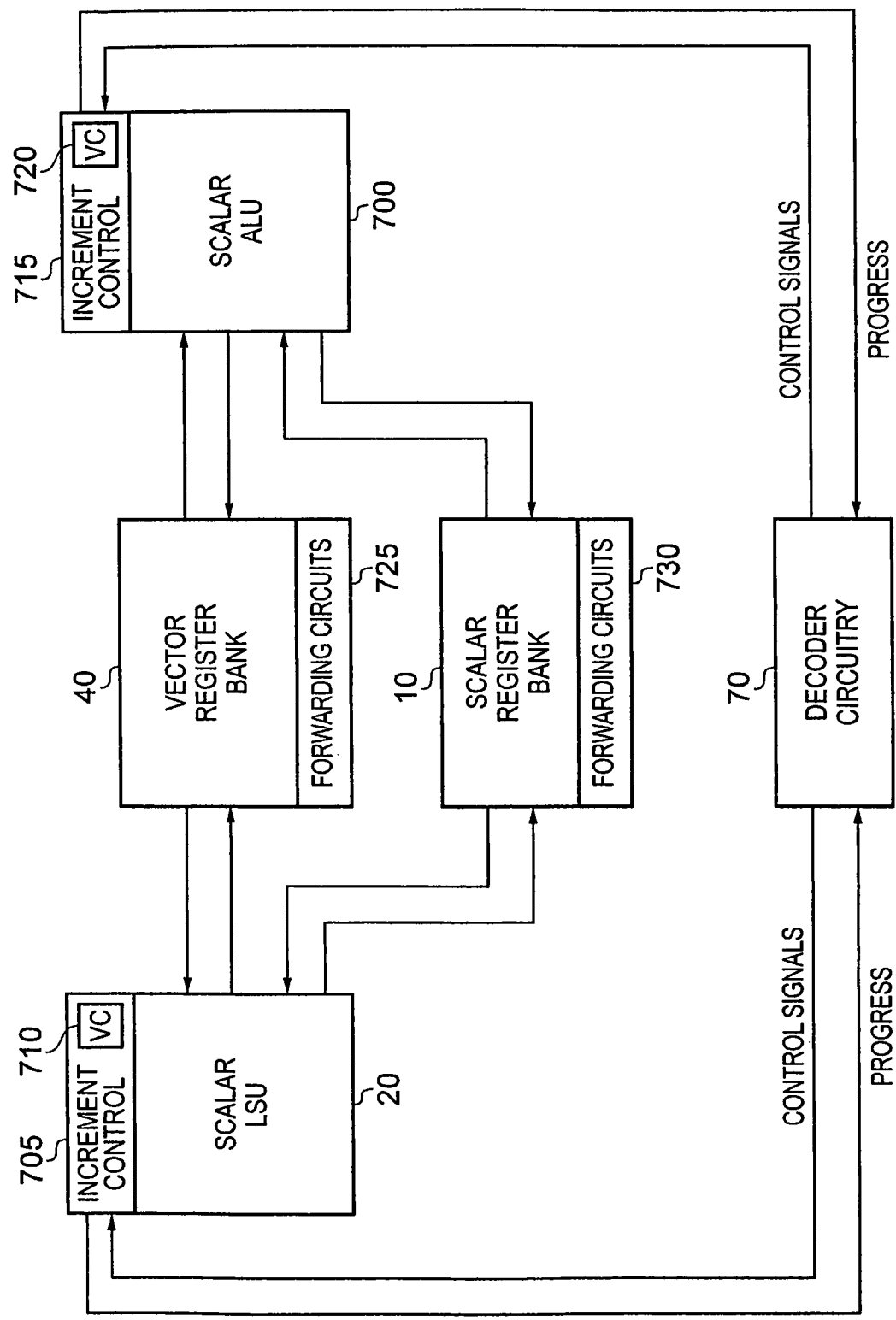

ADD LT    R0, R1, R2

└─→ Test STATUSREG for LT condition
    If condition true {
            ADD R0, R1, R2
    }

DECMOD
ADD LT    R0, R1, R2

└─→ For i=0...VL-1{        VL=4 IN THIS EXAMPLE
            Test VSTATUSREG [i] for LT condition
            If condition true {
            ADD V0[i], V1[i], V2[i]
            }
    }

CONVERTING SCALAR OPERATION TO SPECIFIC TYPE OF VECTOR OPERATION USING MODIFIER INSTRUCTION

FIELD OF THE INVENTION

This application claims priority to GB Application No. 1105667.8 filed Apr. 4, 2011, the entire contents of each of which are incorporated herein by reference.

The present invention relates to a data processing apparatus and method for performing vector operations.

BACKGROUND OF THE INVENTION

One known technique for improving performance of a data processing apparatus is to provide circuitry to support execution of vector operations. Vector operations are performed on at least one vector operand, where each vector operand comprises a plurality of operand elements. Performance of the vector operation then involves applying an operation repetitively across the various operand elements within the vector operand(s).

In typical data processing systems that support performance of vector operations, a vector register bank will be provided for storing the vector operands. Hence, by way of example, each vector register within a vector register bank may store a vector operand comprising a plurality of operand elements.

In high performance implementations, it is also known to provide vector processing circuitry (often referred to as SIMD (Single Instruction Multiple Data) processing circuitry) which can perform the required operation in parallel on the various operand elements within the vector operands. In an alternative embodiment, scalar processing circuitry can still be used to implement the vector operation, but in this instance the vector operation is implemented by iterative execution of an operation through the scalar processing circuitry, with each iteration operating on different operand elements of the vector operands.

The various operations performed by processing circuitry of a data processing apparatus are typically controlled by a sequence of instructions. Each instruction will be decoded, and result in control signals being issued to the relevant processing circuit blocks to cause the operation specified by that instruction to be performed.

For traditional data processing systems configured to implement scalar operations on scalar operands, scalar instructions will be specified defining the various scalar operations required. Accordingly, a particular data processing apparatus will typically execute scalar instructions from a scalar instruction set in order to allow a variety of scalar operations to be performed within the scalar processing circuitry of the apparatus. To support execution of vector operations, it is typically the case that separate vector instructions will be defined to identify the operations required in respect of specified vector operands. Accordingly, this has led to the development of a separate vector instruction set, and typically modern data processing systems that support vector operations are able to execute vector instructions from a specified vector instruction set, whilst also supporting execution of scalar instructions from a corresponding scalar instruction set.

When developing vector instruction sets, it is typically the case that, for most scalar instructions in a scalar instruction set, it is desirable to provide several corresponding vector instructions, for example to support different vector data flow patterns. For example, considering a particular scalar add instruction, it may be necessary to provide several vector add instructions in order to support variants which differ in how data flows between adjacent elements of the vector operands. Examples of vector instruction sets that seek to add at least one vector version of each instruction in the scalar instruction set are Intel's MMX/SSE/AVX instruction sets, IBM's Altivec instruction set and ARM's NEON instruction set.

It is also common for vector instructions to specify at least one control register, for example to identify which elements of the vector operand are active and should be processed by the vector operation, the specification of such control registers requiring availability of bits within the vector instruction encoding.

Many systems operate with fixed size instruction sets, and accordingly there is a significant constraint on the bits available for encoding all of the various different instructions. This constraint is particularly acute when seeking to define all of the variants of vector instruction that would be desirable within a vector instruction set, and the problem is further compounded by the need to identify one or more control registers within those vector instructions.

One known technique for alleviating the above-mentioned encoding space problem is to provide data processing systems which support variable length instructions. An example of a variable-length instruction set is the instruction set provided by the Intel x86 architecture. In accordance with such techniques, the size of the instructions is not fixed, and accordingly it is possible for complex instructions to include more bits in order to allow all of the required information to be encoded within the instruction. Whilst this does alleviate the encoding space problem, it leads to significant additional complexity within the data processing system, for example to enable the start and end of each instruction to be identified, and to enable instructions to be correctly decoded. In many implementations, the complexity associated with the support of variable length instruction sets makes the use of such variable length instruction sets impractical.

Another approach adopted in some highly parallel processor designs seeks to avoid the cost of supporting both a scalar instruction set and a vector instruction set by only providing a vector instruction set. All scalar operations are then implemented by performing a vector operation, with all operand elements except the first operand element being ignored. However, this does increase complexity in the handling of scalar operations.

Accordingly, it would be desirable to provide an improved technique for supporting the execution of vector operations within a data processing apparatus that also supports scalar operations, when using fixed length instructions.

SUMMARY OF THE INVENTION

Viewed from a first aspect, the present invention provides a data processing apparatus comprising: processing circuitry configured to perform operations; a scalar register bank configured to store scalar operands for access by the processing circuitry; a vector register bank configured to store vector operands for access by the processing circuitry, each vector operand comprising a plurality of operand elements; decoding circuitry configured to decode a sequence of instructions in order to generate control signals for the processing circuitry, such that the operations performed by the processing circuitry are dictated by the sequence of instructions; said sequence of instructions including scalar instructions, each scalar instruction specifying a scalar operation to be performed on one or more scalar operands in said scalar register bank; the decoding circuitry being responsive to a decode modifier instruction within said sequence of instructions to alter decoding of a subsequent scalar instruction in said sequence by: mapping at least one scalar operand specified by said subsequent scalar instruction to at least one vector operand in said vector register bank; and determining, in dependence on said scalar operation specified by said subsequent scalar instruction, a vector operation to be performed upon at least a subset of the operand elements within said at least one vector operand.

In accordance with the present invention, a decode modifier instruction is provided which, when encountered by the decoding circuitry, alters the decoding of a subsequent scalar instruction such that it behaves like a vector instruction. In particular, the altered decoding of the subsequent scalar instruction involves mapping at least one scalar operand specified by that scalar instruction to at least one vector operand in the vector register bank, and determining from the scalar operation specified by the scalar instruction an associated vector operation to be performed. Hence, the decode modifier instruction is used to change the behaviour of the subsequent scalar instruction, by creating a vector operation from the scalar instruction having regard to the scalar semantics.

It has been found that such an approach enables a wide variety of vector operations to be supported without the need to provide dedicated vector instructions for each of those vector operations, thereby significantly alleviating the pressure on encoding space within a data processing apparatus executing fixed size instructions.

There are a number of ways in which the vector operation to be performed can be determined from the scalar operation specified by the subsequent scalar instruction. In one embodiment, the vector operation is within one class of a plurality of classes of operation, the decoding circuitry determining said one class from said scalar operation. Hence, by way of example, if the scalar instruction specified an add instruction, the vector operation will also be an add instruction chosen from the addition class of vector operations. A particular class of vector operation may have only a single member of that class, but in alternative embodiments there may be multiple members of the class. For example, there may be multiple types of vector add operation. In that example, the particular vector add operation to be performed when the subsequent scalar instruction specifies a scalar add operation may be dictated solely by the form of the subsequent scalar instruction, or in alternative embodiments additional information can be used, such as may be provided by the decode modifier instruction.

The plurality of classes of vector operation can take a variety of forms, but in one embodiment comprise at least add operations, multiply operations, subtract operations, logical operations, load operations and store operations.

There are a number of ways in which the data processing apparatus can execute the vector operation determined as a result of altering the decoding of the subsequent scalar instruction. In one embodiment, the decoding circuitry, upon altering the decoding of said subsequent scalar instruction, issues control signals to the processing circuitry to cause said vector operation to be performed at least partly in parallel upon said at least a subset of the operand elements within said at least one vector operand. Such an approach, can, for example, be adopted when the processing circuitry of the data processing apparatus includes vector processing circuitry, for example SIMD circuitry, to allow for parallel execution of the operation in respect of the various operand elements of the vector operand(s). In one particular embodiment, the width of the vector processing circuitry may be such that the entire vector operation can be performed in parallel in one go, but it will be appreciated that in alternative embodiments where the size of the vector operands exceeds the width of the vector processing circuitry, the vector operation may be implemented in a sequential manner, where during each iteration the vector operation is performed in parallel across a subset of the operand elements of the vector operands.

In one embodiment, the decoding circuitry, upon altering the decoding of said subsequent scalar instruction, issues control signals to the processing circuitry to cause said vector operation to be performed at least partly sequentially upon said at least a subset of the operand elements within said at least one vector operand.

It is noted that a number of prior art techniques exist that use an instruction to cause a further instruction to be repeated a number of times. For example, the Intel x86 repeat instruction can be used with a small set of byte load, store and compare instructions to implement x86 string operations, whereby the relevant load, store and compare instructions are repeated a number of times. Further, some digital signal processor (DSP) systems support low overhead loops where a block of consecutive instructions can be executed a number of times, typically such techniques adding a repeat count register which holds the number of remaining iterations, and using a block repeat instruction which specifies how many instructions are in the block. Such repeat blocks are often called "zero overhead loops" because the mechanism avoids the usual overhead of performing a decrement, compare and branch each time round the loop. Whilst both of the above mechanisms cause repetition of instructions, it will be appreciated that they do not provide the functionality of the decode modifier instruction of the above embodiments of the present invention, since they do not cause a subsequent scalar instruction to be decoded in an altered manner in order to map one or more scalar operands to vector operands, and to determine a vector operation to be performed in place of the scalar operation specified by the scalar instruction.

Whilst in one embodiment, the need to perform the vector operation at least partly sequentially may arise from the above mentioned situation where the vector operands are of a size that exceeds the width of the vector processing circuitry, there are also other reasons why the vector operation may be performed at least partly sequentially. For example, in one embodiment, there may be certain types of vector operation that are complex to implement using a parallel SIMD data path, in which case those vector operations may be performed by sequential execution through the scalar processing circuitry of the apparatus, with each iteration operating on a different operand element within each vector operand. Indeed, in a low cost implementation, vector processing circuitry may not be provided, and accordingly all vector operations will be supported by passing them sequentially through the scalar processing circuitry.

It is expected that some implementations will use a mixture of the above two implementation techniques, for example adopting a SIMD data path for those vector operations that most impact performance of relevant applications and which lend themselves to a SIMD implementation, and using the simpler sequential implementation technique for vector operations that are less performance critical, or that are harder/more expensive to implement using a SIMD data path.

The decode modifier instruction can take a variety of forms. However, in one embodiment the decode modifier instruction has a type identifier, and the decoding circuitry is configured to determine said vector operation based on the type identifier of the decode modifier instruction, and the scalar operation specified by the subsequent scalar instruction. Such an approach enables both the scalar operation specified by the scalar instruction and the type identifier of the decode modifier instruction to be taken into account when determining the vector operation. For example, in one embodiment the scalar operation specified by the scalar instruction can be used to determine the class of vector operation, with the type identifier information being used to identify a particular instance of vector operation within that class.

In one embodiment, the decode modifier instruction includes a control field for identifying control information referenced by the decoding circuitry when decoding said subsequent scalar instruction. Such control information can take a variety of forms. For example, it may identify the size of the operand elements within each vector operand, it may identify the number of operand elements (in combination with the size information this identifying the length of the vector operands), it may identify which operand elements within the vector operands are to be processed by the vector operation (hence allow masking of certain operand elements), it may identify whether the operand elements are signed or unsigned, etc. Accordingly, when the decoding circuitry maps at least one scalar operand specified by the scalar instruction to at least one vector operand in the vector register bank, such control information can provide additional information about the operand elements within the vector operands that may be required to support correct performance of the vector operation.

As an example of where such control information is useful, information about the size and sign of the operand elements is useful if one wishes to implement "Packed SIMD" where the number of operand elements stored in a vector register depends on the size of the operand elements. As an example, the Q registers provided by ARM's NEON architecture are 128 bits in size and can hence hold sixteen 8-bit data values but only four 32-bit data values.

There are a number of ways in which the control information may be specified within the control field of the decode modifier instruction. In one embodiment, the data processing apparatus further comprises a plurality of control registers for storing control values, and the control field of the decode modifier instruction identifies at least one of the control registers to be referenced by the decoding circuitry when decoding said subsequent scalar instruction.

Whilst in one embodiment the decoding circuitry may map every scalar operand specified by the scalar instruction to corresponding vector operands, this is not a requirement, and in some embodiments only a subset of the scalar operands may get mapped to vector operands. In one embodiment, the decode modifier instruction includes a vector identifier field for identifying which of the scalar operands specified by the subsequent scalar instruction are to be mapped to vector operands in the vector register bank.

There are a number of ways in which the decoding circuitry may map a scalar operand to a corresponding vector operand. In one embodiment, the scalar register bank comprises a plurality of scalar registers having corresponding scalar register identifiers, and the vector register bank comprises a plurality of vector registers having corresponding vector register identifiers, said subsequent scalar instruction specifies said at least one scalar operand by identifying at least one scalar register identifier, and the decoding circuitry converts said at least one scalar register identifier to a corresponding at least one vector register identifier in order to map said at least one scalar operand to said at least one vector operand. Hence, in accordance with such an approach, there is a predetermined mapping between each scalar register and each vector register.

However, in alternative embodiments, the mapping between each scalar register and each vector register may not be predetermined. As an example, instead of using the scalar register identifier to map to a vector register identifier, the value currently stored in a specified scalar register can be used to map to a vector register, such that the actual mapping between the specified scalar register and a vector register varies dependent on the data stored in that scalar register. By way of example, if a scalar register R5 is specified; and it currently stores the value 7, then the decoder circuitry may be arranged to map the scalar register R5 to the vector register V7. Hence, in such an embodiment, a scalar register Rm is mapped to a vector register V [Rm].

In one embodiment, each decode modifier instruction only alters the decoding of the immediately subsequent scalar instruction, such that in the absence of another decoder modifier instruction, any further scalar instruction is decoded in the standard way. However, in one embodiment, the decoding circuitry may be arranged to be responsive to said decode modifier instruction to alter decoding of a plurality of subsequent scalar instructions in said sequence. Hence, in one particular embodiment it may be arranged that a decode modifier instruction alters the decoding of a predetermined number of subsequent scalar instructions.

In one embodiment where the vector operation is performed at least partly sequentially, in particular where the vector operation is performed in N sequential iterations, the data processing apparatus may further comprise an iteration count register to store a current iteration count, the current iteration count being adjusted to keep track of each sequential iteration performed until all N sequential iterations have been performed. In one particular embodiment, the iteration count may be incremented as each sequential iteration is performed, until a maximum count value is reached, or may be decremented from such a maximum value until the count value reaches a minimum value (e.g. zero).

In one particular embodiment, on occurrence of an exception during performance of said vector operation, said iteration count register is accessible to an exception handler. Such an approach enables processing to be resumed at the correct point following handling of the exception.

There are a number of ways in which the data processing apparatus can be arranged to perform the N sequential iterations. In one embodiment, the decoding circuitry is configured to issue a series of control signal sets, each control signal set being associated with one iteration of said N sequential iterations, the decoding circuitry being arranged to update the iteration count register in association with each control signal set being issued. Hence, in such embodiments, the decoding circuitry maintains control of the execution of the various iterations, dispatching control signals to the processing circuitry as and when required to perform each iteration.

However, in an alternative embodiment, the processing circuitry includes iteration control circuitry and is configured to be responsive to a single set of control signals issued by the decoding circuitry to perform each iteration of said N iterations, and to update said iteration count register as each iteration is performed. Hence, in such embodiments, the processing circuitry itself includes the required control circuitry to manage the various iterations.

In one such embodiment, the processing circuitry comprises a plurality of processing units, each processing unit having associated therewith a corresponding iteration count register. The processing circuitry is then configured to perform a first vector operation within a first processing unit of said plurality, whilst performing a second vector operation within a second processing unit of said plurality at least partly in parallel with the performance of said first vector operation. Such an approach can lead to a significant performance improvement, by avoiding the need for one vector operation to complete before the next vector operation can start, with both vector operations being performed at least partly sequentially, but in an overlapped manner.

When there are data dependencies between the first vector operation and the second vector operation, in one embodiment it may not be possible for the later vector operation to start until the earlier one has finished. However, in one embodiment, the data processing apparatus further comprises at least one forwarding path between the first processing unit and the second processing unit to support chaining when one or more data dependencies exist between the first vector operation and the second vector operation. Hence, in accordance with this embodiment, even in the presence of data dependencies, it may be possible for the first and second vector operations to be performed at least partly in parallel, due to the ability to forward data between the first and second processing units as that data becomes available. As will be understood by those skilled in the art, the concept of chaining is known, for example having been used in the Cray-1 computer system developed by Cray Research Inc in the 1970s, and it has been found beneficial in certain embodiments of the present invention to provide structural elements to support chaining.

There are a number of ways of identifying to the decoding circuitry when altered decoding of the subsequent scalar instruction is required. In one embodiment, the data processing apparatus further comprises a decode modifier register, the decoding circuitry being responsive to said decode modifier instruction to set the decode modifier register, and the decoding circuitry being responsive to the decode modifier register being set to alter decoding of the subsequent scalar instruction. Hence, in accordance with such embodiments, the decoding circuitry monitors the state of the decode modifier register, and when that decode modifier register is set, it alters the decoding of the subsequent scalar instruction.

In one such embodiment, following the altered decoding of the subsequent scalar instruction, the decoding circuitry clears the decode modifier register. It will be appreciated that in alternative embodiments, the clearing of the decode modifier register may occur due to other triggers, for example the altered decoding of multiple scalar instructions in embodiments where the presence of the decode modifier instruction causes a predetermined plurality of subsequent scalar instructions to have their decoding altered.

In one embodiment, conditional execution of the vector operation can be supported. In particular, in one embodiment, the subsequent scalar instruction is a conditional scalar instruction specifying a condition to be met in order for the scalar instruction to be executed, and the condition is evaluated independently for each of the operand elements upon which the vector operation is to be performed. In a typical implementation, a scalar status register may be provided for storing status bits used to assess whether a condition specified by a scalar instruction is met. In one embodiment, a vector status register may be provided to replicate, on a per operand element basis, the various status bits that would normally be provided within the scalar status register. Such an approach then enables the condition to be evaluated independently for each of the operand elements upon which the vector operation is performed.

Another mechanism for supporting conditional execution of the vector operation is to arrange the decode modifier instruction to identify a condition to be met in order for the vector operation to be performed. In such an approach, even if the scalar instruction is not itself a conditional scalar instruction, the vector operation performed as a result of the altered decoding of the scalar instruction can still be performed conditionally in respect of each of the operand elements upon which the vector operation is to be performed.

Viewed from a second aspect, the present invention provides a method of performing vector operations within a data processing apparatus having processing circuitry configured to perform operations, a scalar register bank configured to store scalar operands for access by the processing circuitry, and a vector register bank configured to store vector operands for access by the processing circuitry, each vector operand comprising a plurality of operand elements, the method comprising: decoding a sequence of instructions in order to generate control signals for the processing circuitry, such that the operations performed by the processing circuitry are dictated by the sequence of instructions, said sequence of instructions including scalar instructions, each scalar instruction specifying a scalar operation to be performed on one or more scalar operands in said scalar register bank; during said decoding step, in response to a decode modifier instruction within said sequence of instructions, altering decoding of a subsequent scalar instruction in said sequence by: mapping at least one scalar operand specified by said subsequent scalar instruction to at least one vector operand in said vector register bank; and determining, in dependence on said scalar operation specified by said subsequent scalar instruction, a vector operation to be performed upon at least a subset of the operand elements within said at least one vector operand.

Viewed from a third aspect, the present invention provides a computer program product storing in a non-transitory form a computer program for controlling a computer to provide a virtual machine execution environment for program instructions corresponding to a data processing apparatus in accordance with the first aspect of the present invention.

Viewed from a fourth aspect, the present invention provides a data processing apparatus comprising: processing means for performing operations; scalar register bank means for storing scalar operands for access by the processing means; vector register bank means for storing vector operands for access by the processing means, each vector operand comprising a plurality of operand elements; decoding means for decoding a sequence of instructions in order to generate control signals for the processing means, such that the operations performed by the processing means are dictated by the sequence of instructions; said sequence of instructions including scalar instructions, each scalar instruction specifying a scalar operation to be performed on one or more scalar operands in said scalar register bank means; the decoding means, responsive to a decode modifier instruction within said sequence of instructions, for altering decoding of a subsequent scalar instruction in said sequence by: mapping at least one scalar operand specified by said subsequent scalar instruction to at least one vector operand in said vector register bank means; and determining, in dependence on said scalar operation specified by said subsequent scalar instruction, a vector operation to be performed upon at least a subset of the operand elements within said at least one vector operand.

BRIEF DESCRIPTION OF THE DRAWINGS

The present invention will be described further, by way of example only, with reference to embodiments thereof as illustrated in the accompanying drawings, in which:

FIG. 9A illustrates an embodiment where vector operations may be performed in a number of sequential iterations, with the control of those sequential iterations being devolved to the relevant scalar processing units;

DESCRIPTION OF EMBODIMENTS

Figure 1:
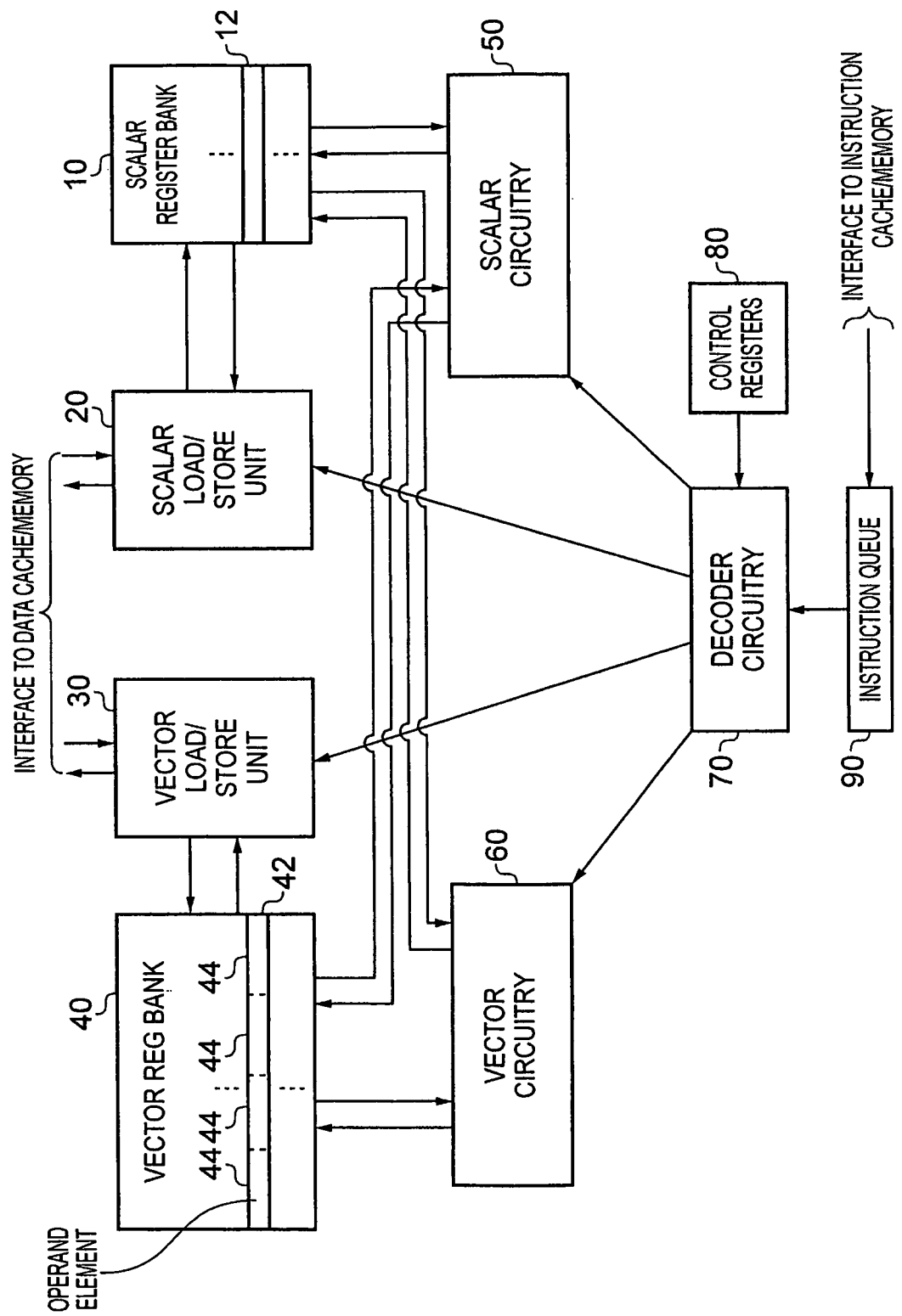
FIG. 1 is a block diagram of a data processing apparatus in accordance with one embodiment.

FIG. 1 is a block diagram of a data processing apparatus in accordance with one embodiment. A stream of instructions are fetched into an instruction queue 90 from an instruction cache and/or memory. The decoder circuitry 70 retrieves a next instruction from the instruction queue, and decodes it in order to produce control signals for forwarding to the relevant processing circuit within the data processing apparatus. In the example of FIG. 1, various processing circuits are provided, including both scalar processing circuits and vector processing circuits. The scalar processing circuitry includes a scalar load/store unit 20 along with various other scalar circuitry 50. The scalar load/store unit 20 responds to control signals from the decoder circuit 70 produced as a result of decoding scalar load or store instructions in order to load data from a data cache and/or memory into specified scalar registers 12 of the scalar register bank 10 or to store data from specified scalar registers 12 back to the data cache and/or memory. Scalar instructions specifying data processing operations will be decoded to cause control signals to be sent to the relevant scalar processing units within the scalar circuitry 50, with the scalar circuitry having access to the scalar register bank 10 in order to obtain the required source operands and to provide a destination for the result data produced by performing such data processing operations.

Similarly, the apparatus of FIG. 1 includes vector processing circuitry, this including both a vector load/store unit 30 and other vector circuitry 60. The vector load/store unit 30 operates in an analogous manner to the scalar load/store unit 20 in order to load vectors of operand elements 44 into specified vector registers 42 of the vector register bank 40 from a data cache and/or memory, and to store such operand elements from specified vector registers 42 back to the data cache and/or memory. In addition, the vector circuitry 60 can be used to perform vector data processing operations using vector operands stored within the vector register bank 40.

As will be discussed in more detail later, the vector processing circuitry 30, 60 may be used in response to the decoder circuitry 70 decoding a vector instruction appearing within the stream of instructions. However, in addition, in accordance with embodiments of the invention to be described in more detail below, the instruction stream may include decode modifier instructions, the decoder circuitry being responsive to a decode modifier instruction to alter the way in which it decodes a subsequent scalar instruction appearing in the instruction stream. In particular, in such a situation, the decoding circuitry maps at least one scalar operand specified by that scalar instruction to at least one vector operand in the vector register bank 40, and determines, in dependence on the scalar operation specified by the scalar instruction, a vector operation to be performed upon at least a subset of the operand elements within the at least one vector operand. Hence, the vector processing circuits 30, 60 can be used to perform a vector operation when the decoder circuitry operates in the above manner to create that vector operation from a scalar instruction that follows a decode modifier instruction within the instruction stream.

As will also be discussed in more detail below, such a vector operation created as a result of modified decoding of a scalar instruction following the decode modifier instruction may also be performed by iterative execution of operations within the scalar processing circuitry 20, 50. Indeed, in some embodiments, no separate vector processing circuits 30, 60 may be provided, and instead all vector operations are performed by iterative execution of operations within the scalar processing circuits 20, 50. In such embodiments, a vector register bank 40 may still be provided for storage of the required vector operands for such vector operations.

As shown in FIG. 1, the scalar circuitry 50 has access to both the scalar register bank 10 and the vector register bank 40 to allow both scalar operations and vector operations to be performed within the scalar circuitry. Similarly, the vector circuitry 60 has access to both the vector register bank 40 and the scalar register bank 10, since certain vector operations performed within the vector circuitry may still require access to one or more scalar operands from the scalar register bank.

As shown in FIG. 1, the decoder circuitry 70 has access to one or more control registers 80, for storing control information referenced by the decoder circuitry 70 when decoding instructions within the instruction stream. The use of such control registers when decoding a scalar instruction following a decode modifier instruction in accordance with embodiments of the present invention will be discussed in more detail later.

Figure 2:
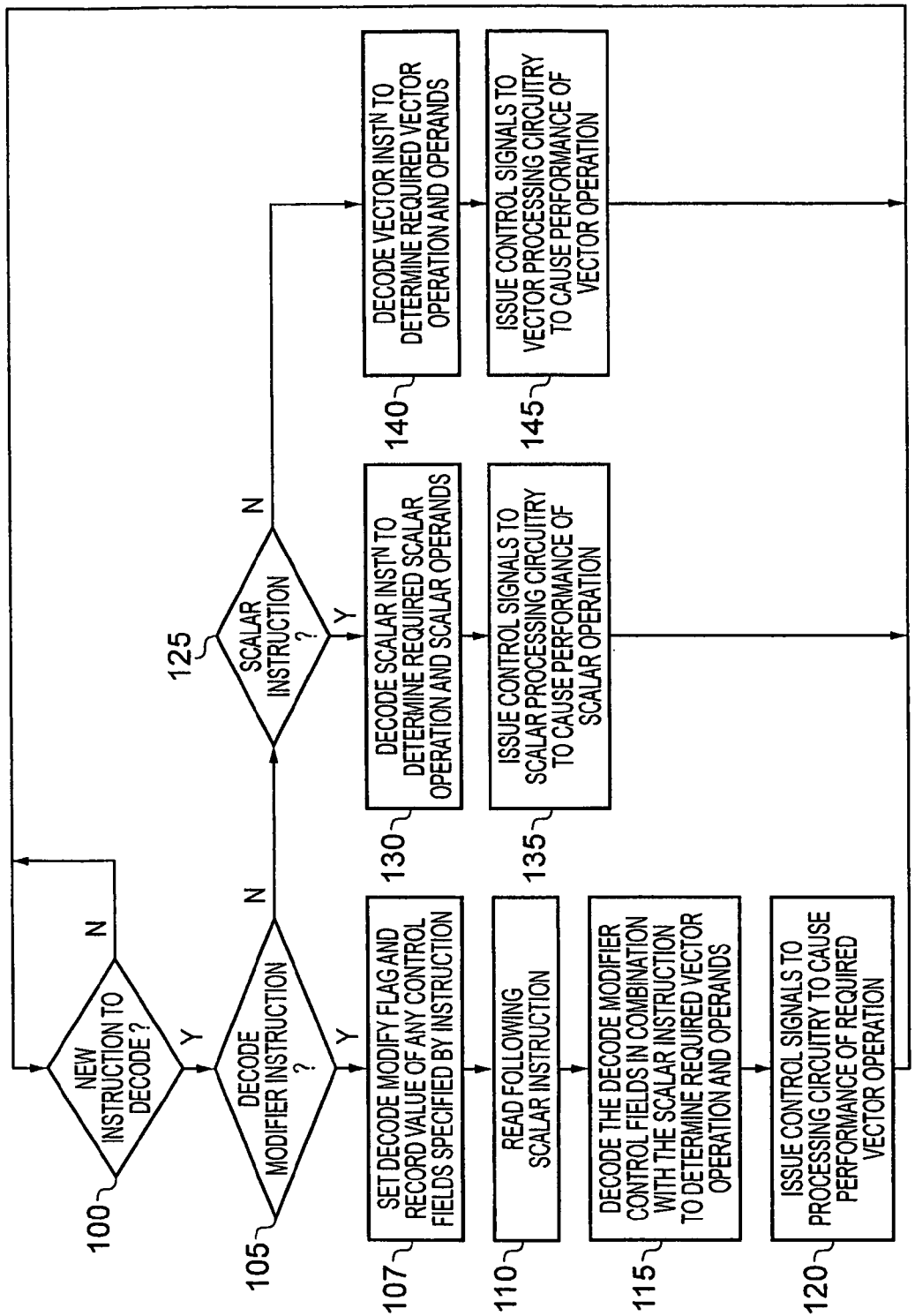
FIG. 2 is a flow diagram illustrating the operation of the decoder circuitry of FIG. 1 in accordance with one embodiment.

FIG. 2 is a flow diagram illustrating the steps performed by the decoder circuitry 70 of FIG. 1 when decoding each instruction. At step 100, it is determined whether there is a new instruction to decode. Assuming there is, the process proceeds to step 105 where it is determined whether the new instruction is the earlier-mentioned decode modifier instruction. Assuming it is not, then it is determined at step 125 whether the instruction is a scalar instruction. If it is, then at step 130 the scalar instruction is decoded to determine the required scalar operation and the relevant scalar operands for that scalar operation. Typically, the scalar operands will either be identified with reference to particular registers 12 of the scalar register bank 10, or by immediate values specified directly within the scalar instruction.

Following step 130, then at step 135 the decoder circuitry issues control signals to the relevant scalar processing circuit 20, 50, in order to cause performance of the required scalar operation, whereafter the process returns to step 100.

If it is determined at step 125 that the current instruction is not a scalar instruction, then it will be a vector instruction, and the process proceeds to step 140, where the vector instruction is decoded to determine the required vector operation and the operands for that vector operation. Again, the operands will typically be identified by particular register identifiers or immediate values specified within the vector instruction. The vector instruction may specify vector operands from the vector register bank 40, but in addition certain vector instructions may specify one or more scalar operands from the scalar register bank 10.

Following step 140, the process proceeds to step 145, where the required control signals are sent to the relevant vector processing circuits 30, 60 to cause performance of the required vector operation, whereafter the process returns to step 100.

Returning to step 105, if a decode modifier instruction is detected, the process proceeds to step 107, where a decode modify flag maintained by the decoder circuitry 70 is set to identify that a decode modifier instruction has been encountered, and that accordingly a modified decoding of the subsequent scalar instruction is required. In addition, any values provided within control fields of the decode modifier instruction are recorded for later reference (such control fields will be described later with reference to FIGS. 8B to 8D). In addition, at step 110, the following scalar instruction is read. Thereafter, at step 115, the decoder circuitry 70 decodes the decode modifier control fields in combination with the scalar instruction in order to determine a required vector operation and associated operands for that vector operation. The vector operation is dictated by the scalar operation specified in the scalar instruction. Hence, by way of example, if the scalar instruction specifies a scalar add operation, the vector operation will be a vector add operation. There may be a plurality of possible vector operations within a particular operation class such as an add class, and in such instances further information, such as the control information provided within the control fields of the decode modifier instruction, can be used in order to select a particular vector operation from the class.

With regard to determining the required operands, the decoder circuitry will map at least one scalar operand specified by the scalar instruction to a corresponding vector operand in the vector register bank 40. In one embodiment, every scalar operand specified by the scalar instruction may be mapped in this way, but in an alternative embodiment a subset of those scalar operands may be mapped to vector operands whilst the remaining scalar operands are retained as scalar operands. The degree to which the scalar operands are mapped to vector operands can be encoded within the decode modifier instruction.

Following step 115, control signals are issued to the relevant processing circuits to cause performance of the required vector operation. In the example of FIG. 1, this may involve sending control signals to the vector processing circuits 30, 60, in order to cause the vector operation to be performed at least partly in parallel upon the various operand elements of the vector operand(s), or alternatively may involve sending control signals to the scalar processing circuits 20, 50 to cause the vector operation to be performed sequentially upon the operand elements within the vector operand(s).

Figure 3:
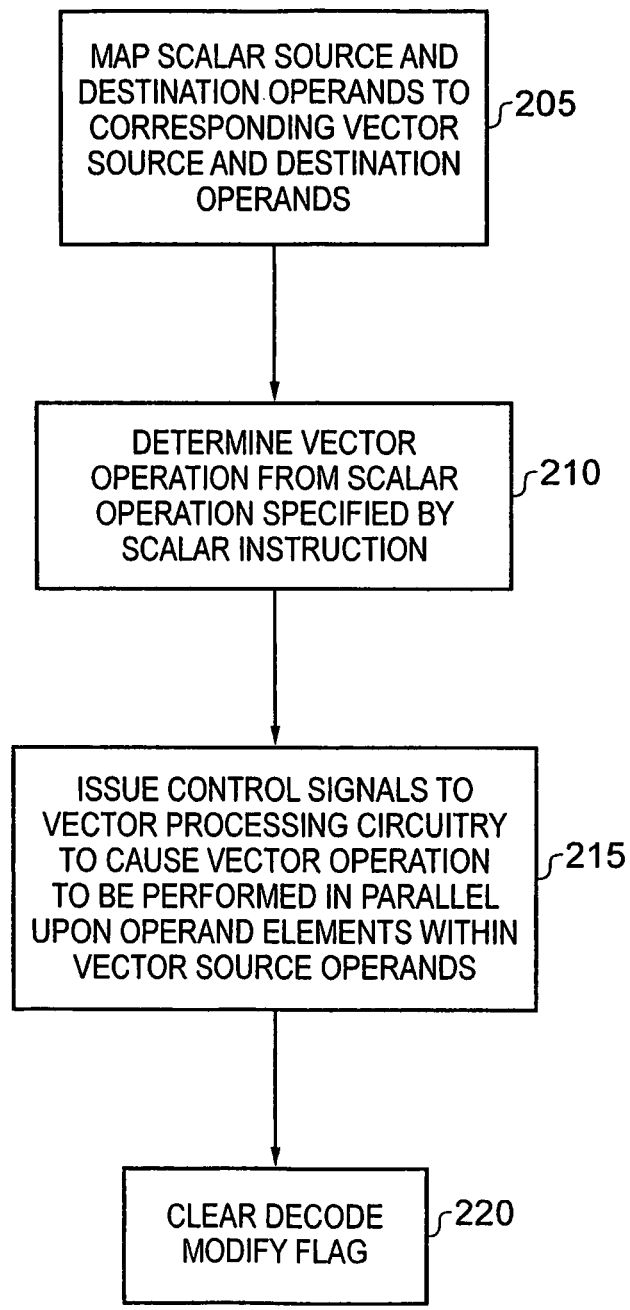
FIG. 3 is a flow diagram illustrating in more detail the steps performed during steps 115 and 120 of FIG. 2 in accordance with one embodiment.

FIG. 3 is a flow diagram illustrating in more detail steps 115 and 120 of FIG. 2. In this example, it is assumed that the vector operation created from the modified decoding of a scalar instruction is dispatched to the vector processing circuitry 30, 60 to cause the vector operation to be performed in parallel across the specified operand elements. At step 205, the scalar source and destination operands specified by the scalar instruction are mapped to corresponding vector source and destination operands, in this example it being assumed that all of the specified operands are mapped to vector operands. As mentioned earlier, in alternative embodiments, only a subset of the specified scalar operands may require remapping.

At step 210, the required vector operation is determined from the scalar operation specified by the scalar instruction. As mentioned earlier, additional information provided within the decode modifier instruction may also influence the selection of vector operation, but the vector operation will be of the same class as the operation specified by the scalar instruction. Hence, by way of example, if the scalar instruction specifies a scalar multiply operation, the vector operation will be a vector multiply operation. Similarly, if the scalar operation specifies a scalar load operation, the vector operation will be a vector load operation.

Following step 210, control signals are issued to the vector processing circuitry 30, 60 to cause the vector operation to be performed in parallel upon the operand elements within the vector source operands (see step 215). Thereafter, the decode modify flag is cleared at step 220, such that if a further scalar instruction is then encountered by the decoder circuitry, it will decode that scalar instruction in the normal manner, i.e. will treat it as a scalar instruction specifying a scalar operation.

In an alternative embodiment, the decode modifier instruction may cause the decode modify flag to be set and remain set for a predetermined number of following scalar instructions, so that the modified decoding functionality is performed in respect of each of those predetermined number of subsequent scalar instructions before the decode modify flag is then cleared. Indeed, in another alternative embodiment, the apparatus can be arranged such that when the decoding circuitry encounters a decode modifier instruction, it sets the decode modify flag, and that decode modify flag is only cleared when a subsequent decode modify clear instruction is encountered, such that all scalar instructions between the decode modifier instruction and the decode modify clear instruction are subjected to a modified decoding by the decoding circuitry.

Whilst FIGS. 2 and 3 are intended to illustrate, by way of a flow diagram, a general sequence of steps that may be undertaken by the decoder circuitry in accordance with one embodiment, it will be appreciated that the exact mechanism by which these steps are performed can be varied dependent on implementation. Hence, by way of example, the following pseudo code represents one specific way in which the technique of FIGS. 2 and 3 could be implemented (the equivalent steps of FIG. 2 have been added in square brackets for reference):

```
if decode modifier instruction [step 105]{
   Set decode modify flag [step 107]
   Record value of any fields of the decode modifier instruction [step 107]
} elseif scalar instruction [step 125]{
   if decode modify flag set {
     decode the decode modifier control fields in combination with
     scalar instruction
                                                              [step 115]
       issue control signals to processing circuitry [step 120]
   } else {
     decode the scalar instruction [step 130]
     issue control signals to scalar processing circuitry [step 135]
```

```
        }
    } else {
        decode the vector instruction [step 140]
        issue control signals to vector processing circuitry [step 145]
    }
```

In this example implementation, it can be seen that, on encountering a decode modifier instruction, the decoder circuitry sets the decode modify flag and records the control field information, and then returns back to step 100. The modified decoding of the subsequent scalar instruction (steps 115, 120) then occurs as a modified version of steps 130, 135 due to the presence of the set decode modify flag.

Figure 4:
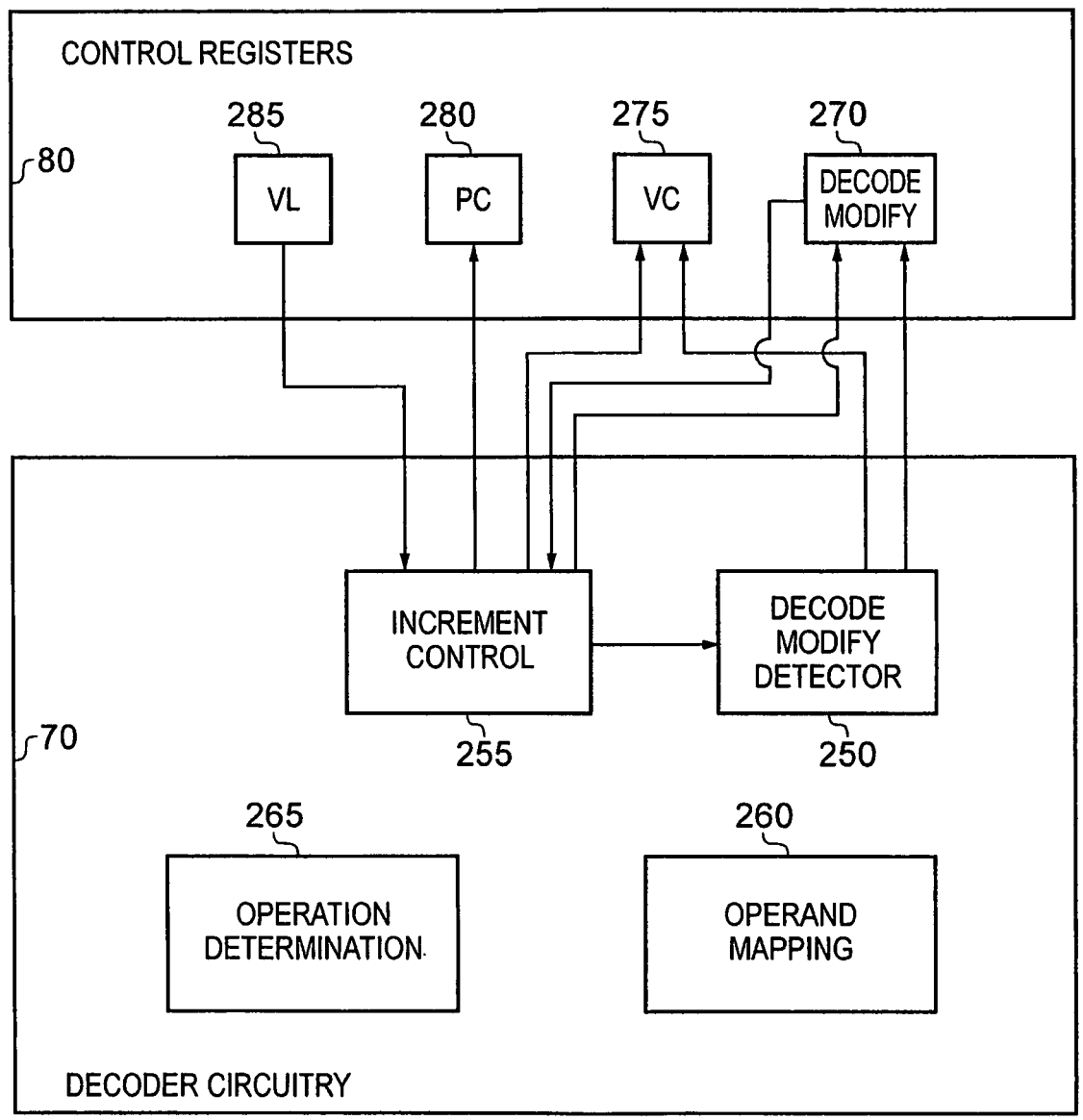
FIG. 4 is a block diagram illustrating in more detail the components provided within the decode circuitry and control registers of FIG. 1 in accordance with one embodiment.

FIG. 4 is a block diagram illustrating in more detail components that may be provided within the decoder circuitry 70 and the control registers 80 in accordance with one embodiment. A decode modify detector 250 is provided within the decoder circuitry 70 for detecting the presence of a decode modifier instruction, and upon such detection to set the decode modify flag 270, which can be maintained within one of the control registers 80. Operand mapping functionality 260 is then provided within the decoder circuitry 70 to perform the above-described mapping of at least one scalar operand specified by the scalar instruction to at least one vector operand in the vector register bank, such functionality being activated when the decode modify flag 270 is set.

Similarly, when the decode modify flag 270 is set, operation determination functionality 265 is activated to determine, from the scalar operation specified by the scalar instruction, a vector operation to be performed.

When performing the vector operation in parallel within the vector processing circuitry, the above-mentioned components are the main components used by the decoder circuitry 70. However, as mentioned earlier, in an alternative embodiment, the vector operation may be implemented by iterative execution through the scalar processing circuits, and in that scenario the additional components also illustrated in FIG. 4 are used. In particular, increment control functionality 255 is provided that would normally merely increment the program counter 280 after each instruction is executed (assuming the instruction is not a branch instruction), but in accordance with the embodiment described in FIG. 4 now also has access to a current iteration count register, referred to in FIG. 4 as the VC register 275. In particular, in such embodiments, when the decode modifier instruction is encountered, the decode modify detector 250 not only sets the decode modify flag 270, but also sets the value of the VC register 275 to zero. Thereafter, as each set of control signals are dispatched to the scalar processing circuits to identify a particular iteration implementing a part of the vector operation, the increment control functionality 255 increments the value within the VC register 275 rather than updating the program counter 280.

This process continues until all of the operand elements have been processed, and accordingly the vector operation is complete. This can be determined with reference to a vector length value identifying the number of operand elements within a vector operand.

In one embodiment, the vector length may be fixed, and hence this information is effectively hardwired into the increment control block 255. However, as illustrated in FIG. 4, in an alternative embodiment the vector length may itself be programmable within a vector length (VL) register 285, and in such embodiments the increment control functionality has access to the VL register 285 in order to determine whether to continue to increment the VC register 275 or not. In particular, the VC register is incremented until its count value is the same as the vector length, at which point the decode modify flag 270 is cleared, the value in the VC register 275 is reset to zero, and the program counter value 280 is then incremented. As shown in FIG. 4, the increment control functionality 255 may directly clear the decode modify flag 270, or alternatively may notify the decode modify detector 250 when the VC register's count value is the same as the vector length, so as to cause the decode modify detector 250 to clear the decode modify flag 270.

The components 250, 255, 260, 265 shown within the decoder circuitry 70 are in one embodiment implemented by hardware, but in an alternative embodiment may be implemented by software, or by a combination of hardware and software elements.

Figure 5:
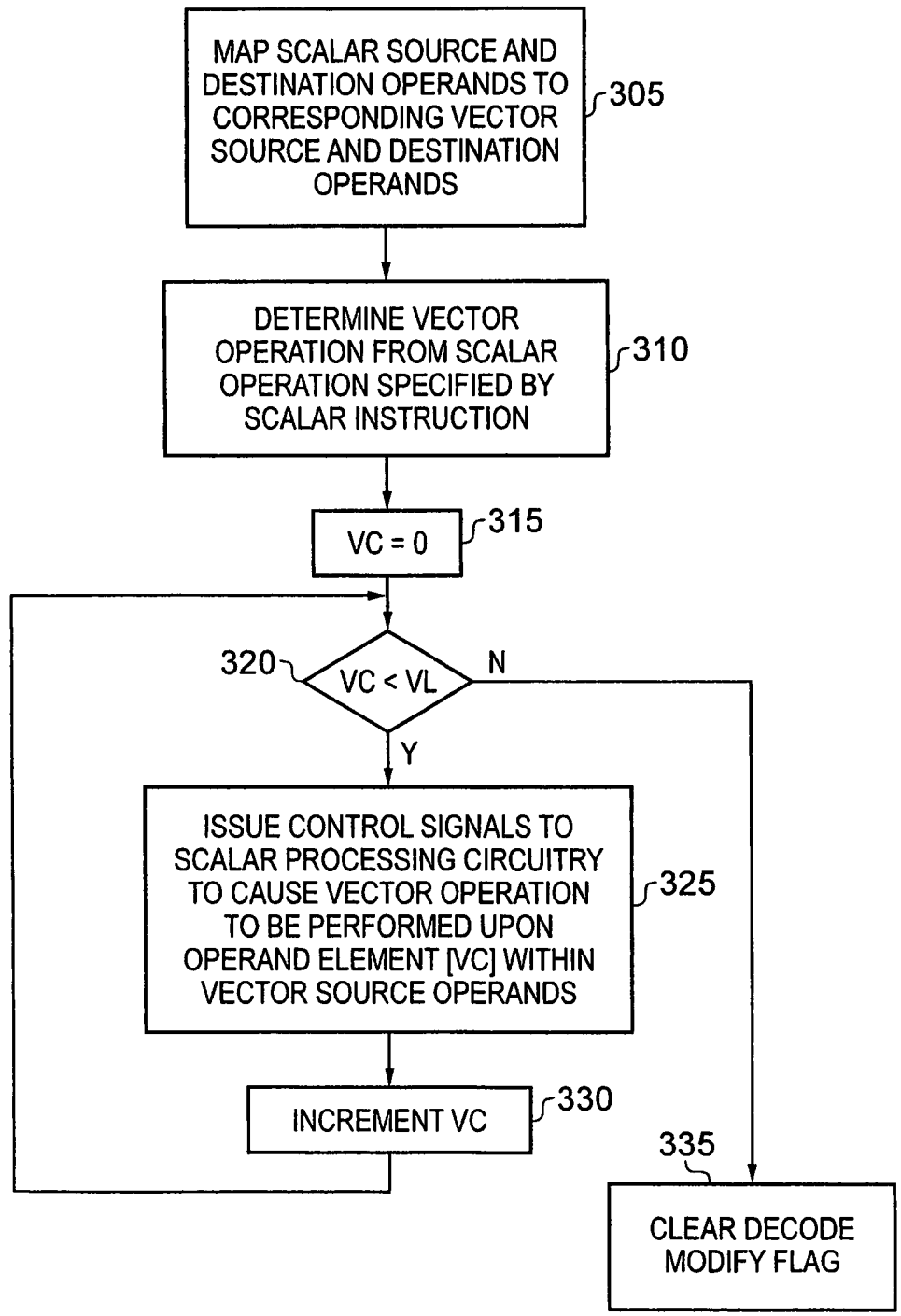
FIG. 5 is a flow diagram illustrating in more detail the steps performed during steps 115 and 120 of FIG. 2 in accordance with an alternative embodiment.

FIG. 5 is a flow diagram illustrating an alternative sequence of steps to be performed instead of the sequence of steps discussed earlier with reference to FIG. 3, for the example where the vector operation is dispatched to the scalar processing circuitry. Steps 305 and 310 correspond to steps 205 and 210 of FIG. 3, and accordingly will not be discussed further herein. However, following step 310, the VC count value 275 is set equal to zero at step 315, whereafter it is determined at step 320 whether the current iteration count given by the VC value is less than the vector length value. If it is, then the process proceeds to step 325, where control signals are issued to the scalar processing circuitry 20, 50 to cause the vector operation to be performed upon those operand elements within the vector source operands associated with that particular iteration. In a simple case, these will merely be the operand elements that occupy the location VC within the vector operand registers (e.g. operand element 0 of each vector operand when VC=0, operand element 1 of each vector operand when VC=1, etc).

Thereafter, at step 330, the count value of VC is incremented, and the process returns to step 320. When it is determined that the count value VC is no longer less than the vector length, this indicates that all of the required iterations have been performed, and accordingly the vector operation has been performed across all required operand elements. Accordingly, the process then branches to step 335, where the decode modify flag is cleared. As discussed when describing step 220 of FIG. 3, various alternative embodiments may cause the decode modify flag to be cleared at a different time, for example if the decode modifier instruction is to affect multiple subsequent scalar instructions.

Figure 6:
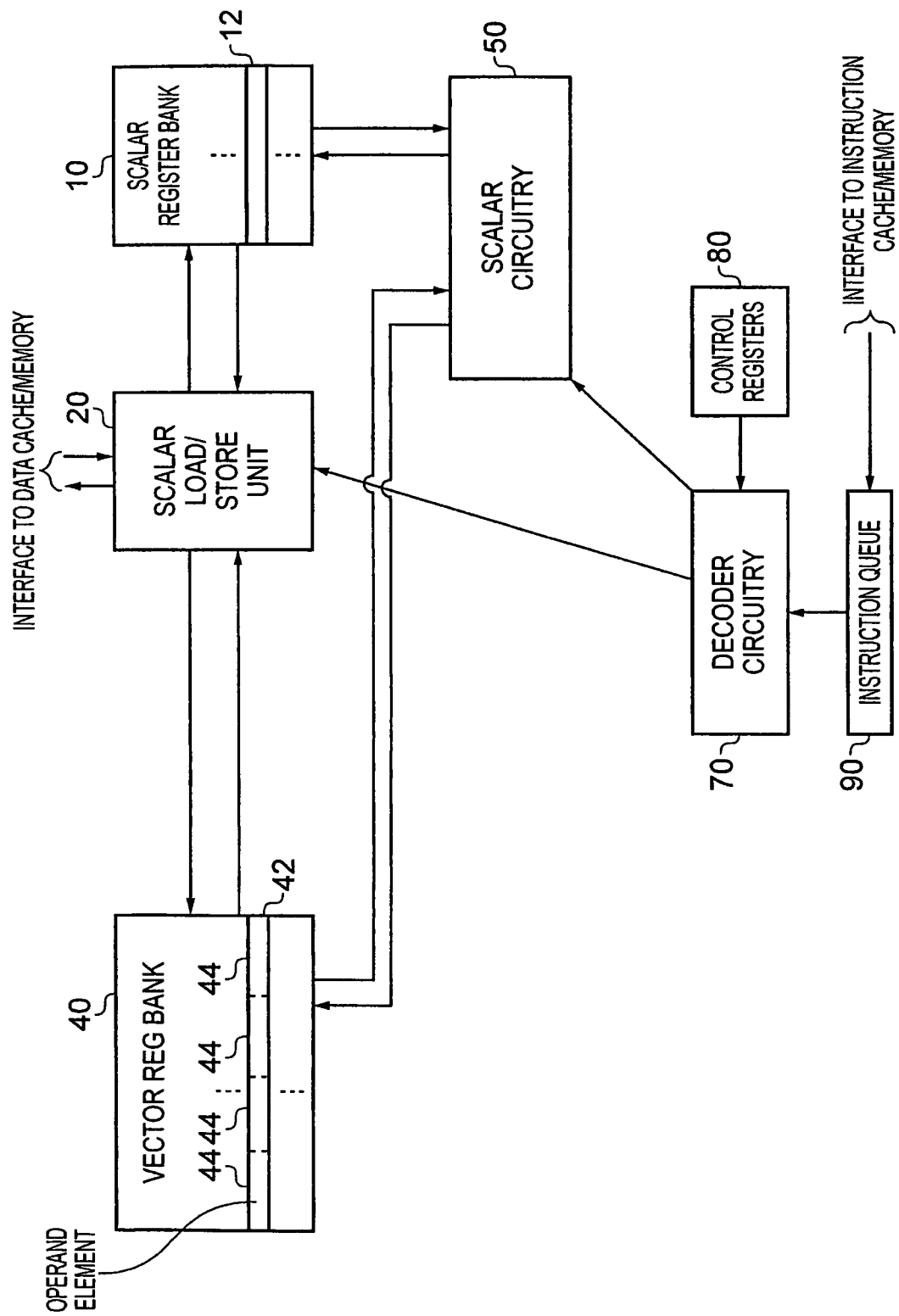
FIG. 6 illustrates a data processing apparatus in accordance with an alternative embodiment.

FIG. 6 illustrates an alternative embodiment to FIG. 1, where no vector processing circuitry is provided. In this example, it may be the case that the instruction stream includes no vector instructions, but merely includes scalar instructions along with decode modifier instructions in situations where a vector operation is required. In such situations, when a decode modifier instruction is encountered, it will be decoded in combination with the subsequent scalar instruction in order to identify a required vector operation, and that vector operation will be performed through iterative execution within the scalar processing circuitry 20, 50. The vector register bank 40 is retained for holding the required vector operands for such vector operations.

Of course, if desired, actual vector instructions could also be included in the instruction stream, with the associated vector operation being implemented through iterative execution within the scalar processing circuitry.

In the following description, the above-mentioned decode modifier instruction will be referred to in the examples as a "DECMOD" instruction, and scalar instructions will be specified as "op Rd, Rm, Rn" where Rm and Rn specify the source registers in the scalar register bank and Rd specifies the destination register in the scalar register bank.

In the absence of exception or interrupts and where the operation does not cause a branch, the meaning of the instruction sequence 'DECMOD; op Rd,Rm,Rn' is:

>For i=0..VL-1 {
>    op Vd[i],Vm[i],Vn[i]
>}
>(assuming a vector length of VL).

For example, the following is a simple program written using a conventional vector instruction set architecture (ISA) (ARM's NEON ISA) to add 4 elements in vector register Q0 to 4 elements in vector register Q1 and multiply the resulting 4 elements by the 4 elements in vector register Q2 placing the result in vector register Q3:

VADDQ.I32 Q3,Q0,Q1
VMULQ.I32 Q3,Q3,Q2

Using the technique of the above described embodiments, the same program would be written as follows:

DECMOD
ADD R3,R0,R1
DECMOD
MUL R3,R3,R2

Note that each vector instruction in the conventional vector ISA is replaced by a pair of instructions, namely the DECMOD instruction and a scalar instruction, and that each vector register specifier in the conventional vector ISA is replaced by the corresponding scalar register specifier. The effect of the DECMOD instruction is to cause the instruction decoder to interpret the scalar instruction as though it was a vector instruction and to interpret the scalar register specifiers as though they were vector register specifiers. The meaning of the result is the same as executing the scalar instruction VL times operating on successive elements of the vector register each time.

The decode modifier instruction can be added in front of almost any scalar instruction (for example scalar instructions specifying integer arithmetic, floating point arithmetic, loads, stores, etc). However, in one particular embodiment, it may be appropriate to disallow certain combinations. For example, adding a decode modifier instruction directly before a branch or conditional branch instruction would not be useful and could be disallowed. Similarly, adding a decode modifier instruction directly before another decode modifier instruction could be treated as not well defined and could be disallowed.

In one embodiment, an exception whilst executing an instruction sequence "DECMOD; op, Rd, Rm, Rn" needs to allow the offending instance "i" to be identified and, after dealing with the exception, needs to be able to restart execution at the next instance. For this purpose, the value of i in the earlier pseudo code should be stored in an architectural register which can be accessed by the exception handler, as is the case when using the VC register 275 of the earlier-described FIG. 4. On restarting the instruction, the value of this VC register can be restored to indicate that the above sequence is already executing. Conceptionally, such an approach is analogous to extending the PC register with a few extra bits to identify the current iteration number of the vector operation resulting from the decoding of the DECMOD instruction and subsequent scalar instruction.

Figure 7A:
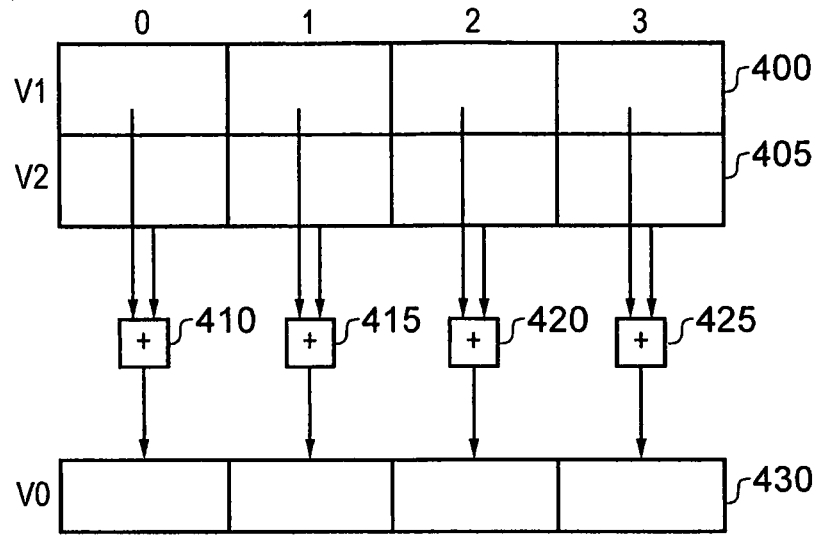
FIGS. 7A to 7D illustrates how various different vector flow patterns can be supported in accordance with one embodiment.

In one embodiment, it is desirable to support different vector data flow patterns when performing vector operations. A common data flow pattern found in vector instruction sets combines corresponding input operand elements of the input vector operands to produce each result operand element of the result vector operand. That is, Vd[i] is computed from Vm[i] and Vn[i]. An example of such a common data flow pattern is illustrated in FIG. 7A for the situation where the DECMOD instruction is followed by an add instruction. To distinguish this variant of DECMOD instruction from other variants to be discussed in more detail below, this variant is called the DECMOD_MAP instruction. On encountering this instruction, the subsequent scalar add instruction illustrated in the example of FIG. 7A is subjected to a modified decoding where each scalar operand specified by the instruction is mapped to a corresponding vector operand. Hence, the source registers R1 and R2 are mapped to the source vector registers V1 400 and V2 405. Similarly, the result scalar register R0 is mapped to the vector register V0 430.

In this example, it is assumed that the vector length is four, and accordingly there are four operand elements within each vector register. Accordingly, a sequence of four add operations 410, 415, 420, 425 are performed to produce the result data elements stored within the respective locations of the vector register V0 430. In embodiments providing vector ALU (arithmetic logic unit) circuitry (such as within the vector circuitry 60 of FIG. 1), these four add operations may be performed in parallel. Alternatively, these four add operations may be performed sequentially within a scalar ALU (such as provided within the scalar circuitry 50 of FIG. 1).

Figure 7B:
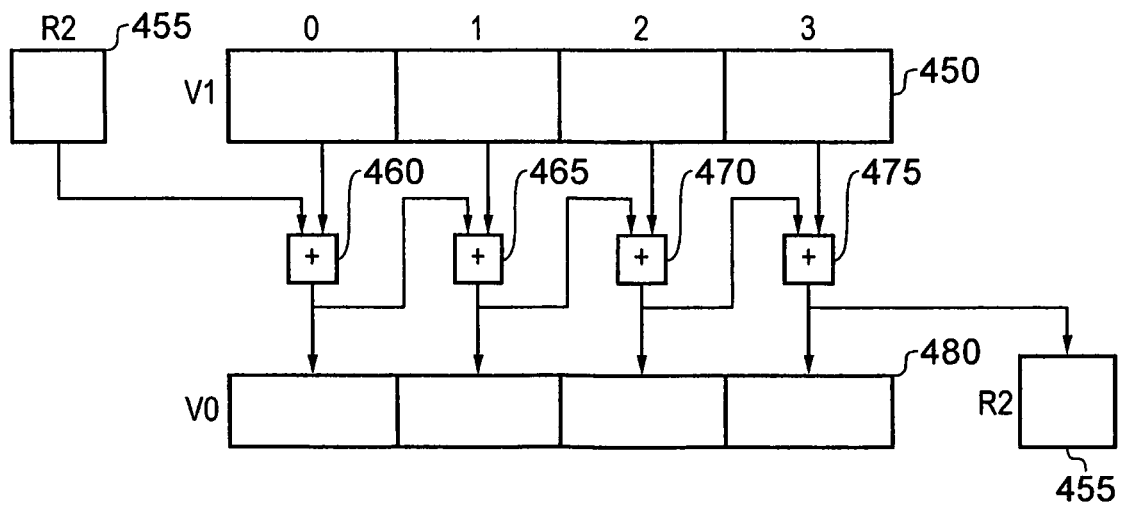

FIG. 7B illustrates, by way of example, another data flow pattern that may be supported. In this example, an inclusive scan version of the DECMOD instruction is provided. For this instruction, one of the scalar source operands, and also the scalar destination operand, of the subsequent scalar instruction are mapped to vector operands, but the second scalar source operand is retained as a scalar operand. Accordingly, it can be seen that the source operands become the vector register V1 450 and the scalar register R2 455. Again, the presence of the add instruction causes the sequence of add operations 460, 465, 470, 475 to be performed to implement the vector operation. However, it will be seen that this variant of vector add operation accumulates a partial result across the vector, and as a result the add operation 465 takes as one of its inputs the output from the add operation 460, the add operation 470 takes as one of its inputs the output of the add operation 465 and the add operation 475 takes as one of its inputs the output of the add operation 470. The final result is stored back into the scalar register R2 455.

Since the DECMOD instruction is the same size as any other instruction, for example being a 32 bit instruction assuming a 32-bit instruction set architecture, there is enough encoding space within the DECMOD instruction to specify a number of different variants such as the inclusive scan version, and the subsequent scalar instruction then identifies the required vector operation (in this example an add), and the various operands.

Figure 7C:
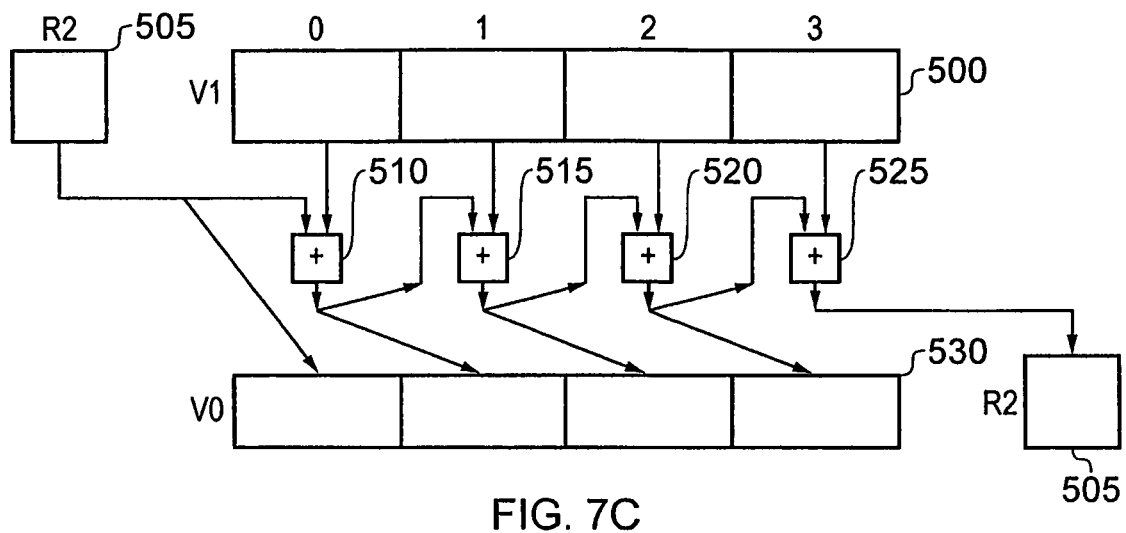

FIG. 7C illustrates another alternative data flow pattern, in this example the decode modifier instruction being an exclusive scan variant. It can be seen from FIG. 7C that this causes an operation very similar to that discussed in FIG. 7B, but the output from each addition operation is stored into the adjacent operand element position within the result vector register 530, rather than in the operand element position corresponding to the operand element position of the input from the source vector register 500. As with the FIG. 7B example, the decode modifier instruction encodes the data flow pattern and identifies which source operands should be mapped to vector operands, whilst the subsequent scalar instruction identifies the actual operation to be performed and the various operands.

Figure 7D:
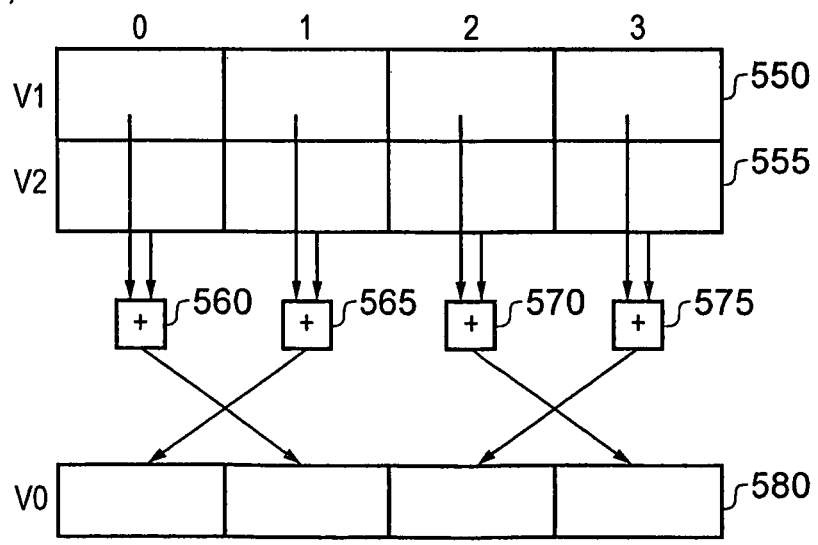

FIG. 7D illustrates a further example of a data flow pattern that could be used, where the decode modifier instruction is a transpose variant, with the transpose being performed in respect of the outputs from each of the addition operations 560, 565, 570, 575. It will be appreciated that the operation is very similar to that described in FIG. 7A, but with the results being output to different operand element positions within the vector output register 580. Whilst in this example the transpose is performed with respect to the outputs from the addition, various other transpose variants may be provided where the inputs are transposed prior to the addition taking place.

FIGS. 7A to 7D illustrate just four examples of different data flow patterns that can be supported, but it will be appreciated that there are many different data flow patterns which can be supported given the encoding space available for the decode modifier instruction. Accordingly, through use of the decode modifier instruction to alter the decoding of a subsequent scalar instruction, it is possible to create many different variants of vector operation from each scalar instruction, without the need to provide dedicated vector instructions for each of those variants. The subsequent scalar instruction remains entirely unchanged, and indeed identifies a perfectly valid scalar instruction which can be executed as a scalar instruction in the absence of a preceding decode modifier instruction. Hence, both scalar operations and vector operations can be supported in a very efficient manner, with a significant reduction in the constraints on encoding space when compared with the prior art techniques which seek to separately encode each of the required scalar instructions and vector instructions.

Figure 8A:
FIGS. 8A to 8D schematically illustrate the format of the decode modifier instruction in accordance with various embodiments.
Figure 8B:
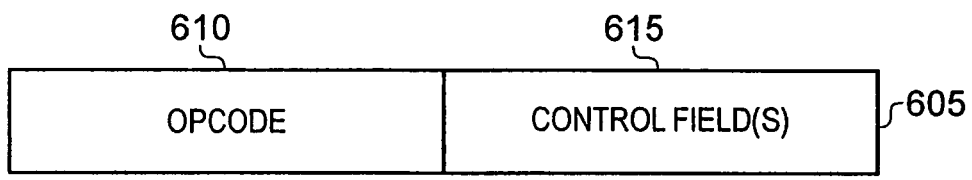
Figure 8C:
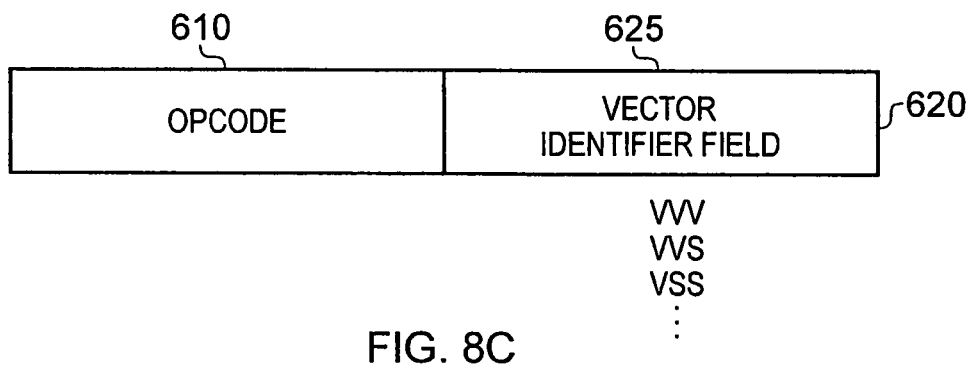
Figure 8D:
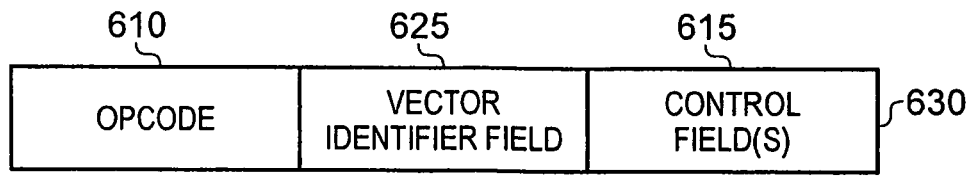

FIGS. 8A to 8D schematically illustrate various pieces of information which may be provided within the decode modifier instruction. In the example of FIG. 8A, the decode modifier instruction 600 merely comprises an opcode, also referred to herein as a type identifier. As is apparent from the earlier discussion of FIGS. 7A to 7D, the type identifier can be used to encode the type of vector data flow pattern required.

As shown in FIG. 8B, in addition to such an opcode 610 being provided within the decode modifier instruction 605, one or more additional fields 615 can be provided containing control information. The control information may be encoded directly within these control fields, or may be specified with reference to one or more registers within the control registers 80 shown in FIG. 1. It will be appreciated that many different items of control information can be provided, but as a non-exhaustive list the types of information that could be provided include an indication of the size of each operand element within the vector operands, the number of operand elements within each vector operand, mask information identifying which operand elements are to be subjected to the operation and which are not, an indication as to whether the operand elements are signed or unsigned, etc. As another example, the control fields could be used to specify conditional information, for example a condition that is to be met in order for the various parts of the vector operation (for example the various four add stages illustrated in the examples of FIG. 7A to 7D) to be performed. Handling of conditionality in respect of the vector operations will be discussed in more detail later with reference to FIGS. 10A and 10B.

In the example of FIG. 8C, in addition to the opcode 610 being provided within the decode modifier instruction 620, an additional vector identifier field 625 may be provided to identify which scalar operands specified by the subsequent scalar instruction are to be mapped to vector operands. Whilst in one embodiment it may be appropriate to map all of the scalar operands to vector operands (such as in the earlier described examples of FIGS. 7A and 7D), in other examples it may be appropriate for one of more of the scalar operands to be retained as scalar operands (as for example was the case with the operations of the earlier-described FIGS. 7B and 7C). The vector identifier field 625 can be used to encode this information. In one embodiment, where it is assumed for example that there are three scalar operands specified by the subsequent scalar instruction, three bits of information would be required, with the value of each bit indicating whether the associated scalar operand was to be mapped to a vector operand or not. Hence, a value of 111 may indicate that all three scalar registers should be mapped to vector registers, a value of 110 would indicate that two of the scalar registers are to be mapped to vector, registers with the third scalar register being retained as a scalar register, etc.

In one embodiment, a value of 000 would not be allowed, this indicating that all of the scalar registers should be retained as scalar registers. However, in an alternative embodiment, such a value could still be supported. For example, if a decode modifier instruction having a vector identifier field 625 identifying all of the operands as scalar operands were to precede a multiply instruction of the form MUL R0, R0, R1, this would result in exponentiation of the register R1, with the result being stored in R0. In effect the multiply operation would be performed VL times, where VL is a predetermined vector length, but in each of the iterations the scalar registers would be used.

FIG. 9A illustrates a particular example of the circuitry of FIG. 6, where the vector operations are performed within the scalar processing circuits, but where the increment control functionality described with reference to FIG. 4 is devolved to the various scalar processing circuits. Accordingly, in this example, it is assumed that both the scalar load store unit 20 has some associated increment control circuitry 705, and a scalar arithmetic logic unit (ALU) 700 (such as may be provided within the scalar circuitry 50 of FIG. 6) also has its own associated increment control circuitry 715. Each increment control circuit 705, 715 has access to its own VC count value 710, 720.

When adopting such an approach, the decoder circuitry 70 can issue a single set of control signals to the relevant scalar circuit to implement the required vector operation, with that scalar processing circuit then taking control of the various iterations required. The associated increment control circuit 705, 715 can periodically send progress information back to the decoder circuitry 70 so that the decoder circuitry is advised of progress of the vector operation. In a simple case, the progress information may merely take the form of a completion signal indicating when the vector operation has been completed (i.e. all of the required iterations have been performed within the associated scalar processing circuitry).

As shown in FIG. 9A, both of the scalar circuits 20, 700 have access to the vector register bank 40 and the scalar register bank 10 to enable them to access the required operands when performing their specified operations. Hence, by way of example, the scalar LSU 20 may be arranged to perform a vector load operation by repetitive execution of a load operation, whilst the scalar ALU 700 may be arranged to perform a subsequent vector add operation by iterative execution of an add operation. Assuming there are no data dependencies between the vector load operation and the vector add operation, these two activities can clearly occur in parallel. However, if there are any data dependencies between the vector load operation and the subsequent vector add operation, then in one embodiment the decoder circuitry 70 may be arranged to not issue the relevant control signals for the vector add operation to the scalar ALU 700 and associated increment control circuitry 715 until the scalar LSU 20 has completed the required vector load operation (as indicated by a completion signal issued from the increment control circuitry 705 back to the decoder circuitry 70). However, it will be appreciated that such an approach can introduce a significant performance penalty.

Accordingly, in one embodiment, both the vector register bank 40 and the scalar register bank 10 are provided with appropriate forwarding circuits 725, 730, respectively, so as to support chaining when there are one or more data dependencies between the vector operation performed on the LSU 20 and the vector operation performed within the ALU 700. This will be illustrated in more detail with reference to FIGS. 9B and 9C.

Figure 9B:
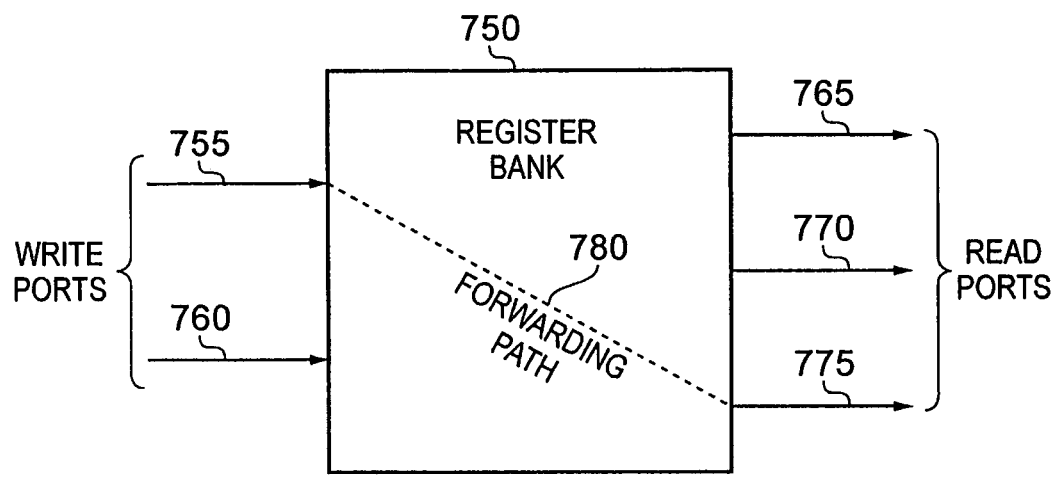
FIGS. 9B and 9C illustrate how forwarding paths provided by the apparatus of FIG. 9A can be used to support chaining when one or more data dependencies exist between different vector operations.

Firstly, considering FIG. 9B, this schematically shows the effect of the forwarding circuits within a particular register bank. The register bank 750 shown in FIG. 9B may be either the vector register bank 40 or the scalar register bank 10. In one embodiment, the register bank is provided with two write ports 755, 760 and three read ports 765, 770, 775. Assuming the LSU 20 is arranged during a particular iteration to load a particular operand element into a destination vector register via the write port 755, and the scalar ALU 700 is attempting to read that operand element via the read port 775, then the forwarding circuit 725 can implement a forwarding path shown schematically by the dotted line 780 in FIG. 9B, so that as soon as that operand element becomes available at the write port 755, it can be output from the read port 775 to the scalar ALU without waiting for the update within the vector register bank to take place. Without the forwarding path, the scalar ALU will typically need to wait until the entirety of the particular vector register had been updated (typically this taking multiple iterations of loads through the scalar LSU) before it would then be able to start reading data from that vector register.

Figure 9C:
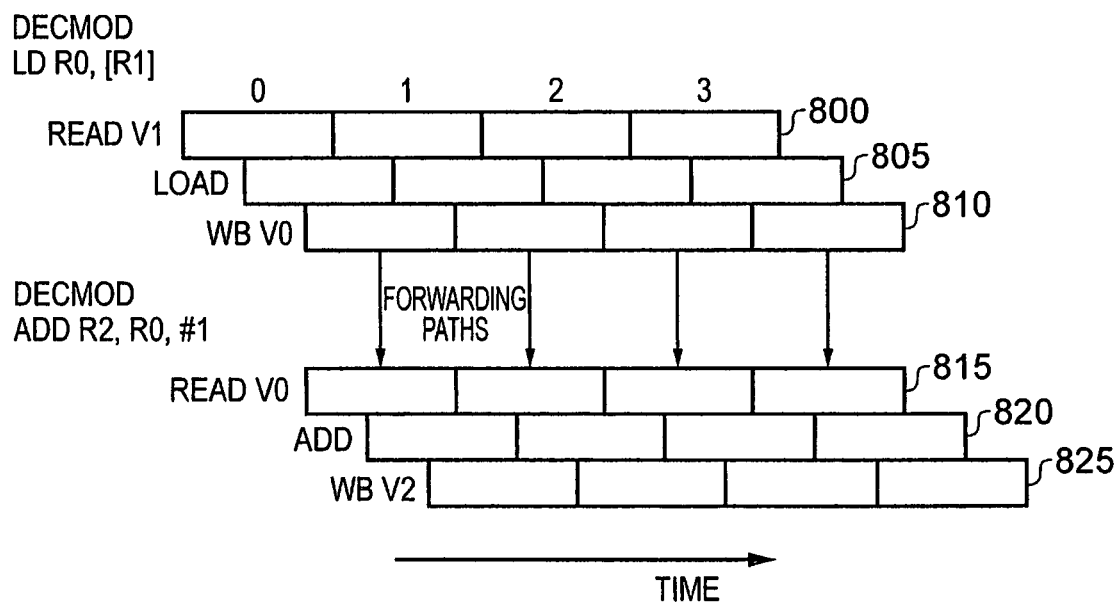

The time saving that can be achieved by the use of such a forwarding path and chaining mechanism is illustrated schematically in FIG. 9C. In this example, it is assumed that a decode modifier instruction followed by a scalar load instruction is used to implement a vector load operation. In particular, the scalar register R1 is mapped to the vector register V1, and the contents of the vector register V1 are used to identify a read address from which a vector of data elements are to be obtained. This results in the sequence of register reads denoted by the reference numeral 800 in order to read the operand elements from the vector register V1, and at some time later the sequence of loads denoted by the reference numeral 805. At a time delayed with respect to the loads, this would also result in a sequence of register write back operations (denoted by the reference numeral 810), whereby each operand element is written to the vector register V0 of the vector register bank.

Assuming that following the vector load operation, it is desired to perform a vector add operation specified by the combination of the decode modifier instruction and the scalar add instruction illustrated on the left hand side of FIG. 9C, then without the forwarding paths it would not be possible to start performing this add operation until the entirety of the write back process denoted by the reference numeral 810 had taken place, and accordingly the vector register V0 became available for reading. However, using the forwarding paths, it can be seen that the sequence of read operations denoted by the reference numeral 815 can occur at the same time as the sequence of write back operations 810, since as soon as each operand element within the vector V0 is available on the write port, it is forwarded out on the required read port to the scalar ALU. This enables the sequence of add operations to occur as denoted by the reference numeral 820, each add operation adding the value 1 to the operand element read from V0. Thereafter, as denoted by the reference numeral 825, a sequence of write back operations can occur to the destination register V2.

Accordingly, it can be seen that the use of such forwarding paths can provide significant performance improvements when handling data dependencies between adjacent vector operations.

Figure 10A:
FIGS. 10A and 10B illustrate how conditional execution of vector operations is supported in accordance with one embodiment.

As shown in FIG. 10A, it is often the case that scalar instructions are conditional. In particular, in the example shown in FIG. 10A, the add instruction is conditional on the "less than" condition being true. To test a condition specified in the instruction, it is common to refer to a set of condition bits held within a scalar status register 850. In accordance with one well-known format, four condition bits are provided, namely the C bit (carry flag), the N bit (negative flag), the V bit (overflow flag) and the Z bit (zero flag). Each condition equates to a particular combination of these bits, and hence the values of the bits can be analysed to determine whether the condition is met or not met. Accordingly, in the example of FIG. 10A, the add instruction is only executed if the less than condition is determined to be true.

Figure 10B:
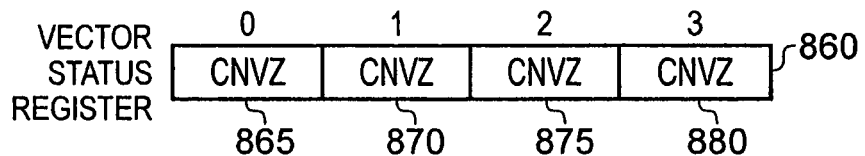

As described above, where the scalar instruction follows a decode modifier instruction, the decoder performs an altered decoding of the scalar instruction, and in one embodiment the technique supports situations where the scalar instruction is a conditional scalar instruction. In particular, as shown in FIG. 10B, in one embodiment a vector status register 860 is provided, with each element 865, 870, 875, 880 of that vector status register 860 containing a set of four status bits. As is well understood in the art, the various bits in a scalar status register such as the status register 850 of FIG. 10A are typically updated using compare instructions. In one embodiment, if such a compare instruction is preceded by a decode modifier instruction, this causes a vector compare operation to be constructed to provide for independent update of the various elements 865, 870, 875, 880 within the vector status register 860.

Accordingly, when a decode modifier instruction is followed by a conditional instruction, such as the add LT instruction illustrated in FIG. 10B, this causes an equivalent vector add operation to be constructed where each instance of the add operation is tested against the condition bits in the relevant element of the vector status register 860 in order to determine whether the operation should be performed. Hence, for instance 0, the status bits 865 are evaluated to determine whether the less than condition is true, and if so the add operation is performed with regards to the operand elements at position 0 in the various vector operands. However, wherever it is determined that the condition is not true, then the corresponding add operation is not performed. Purely by way of example, it may hence be found that the condition is true for element positions 0 and 2 and not true for element positions 1 and 3. In this case, only two of the four add operations forming the vector add operation are performed.

In another embodiment, such conditionality can be supported even if the scalar instruction following the decode modifier instruction is not itself conditional. In particular, the decode modifier instruction can encode a condition that is to be met, such that when the vector operation is constructed based on the altered decoding of the subsequent scalar instruction, the condition specified in the decode modifier instruction is used to make the vector operation conditional. Hence, purely by way of example, if the decode modifier instruction specified the less than condition, and was followed by a non-conditional scalar add instruction, then the resultant vector operation would be exactly as shown in FIG. 10B.

Figure 11:
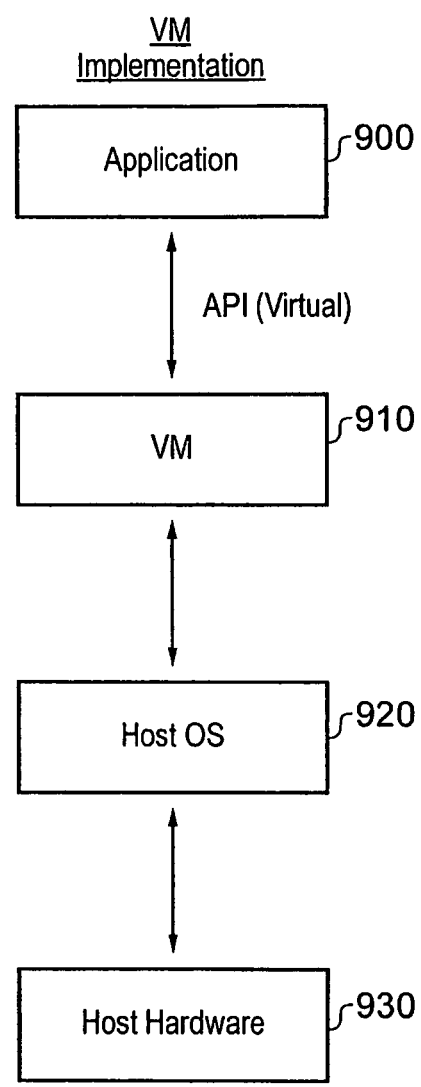
FIG. 11 illustrates a virtual machine implementation that may be used in accordance with one embodiment.

FIG. 11 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 930 typically running a host operating system 920 supporting a virtual machine program 910. Often, large powerful processors are required to provide virtual machine implementations which execute at a reasonable speed, but such an approach may be justified in certain circumstances, such as when there is a desire to run code native to another processor for compatibility or re-use reasons. The virtual machine program 910 is capable of executing an application program (or operating system) 900 to give the same results as would be given by execution of the program by such a real hardware device. Thus, the program instructions, including the decode modifier instructions described above, may be executed from within the application program 900 using the virtual machine program 910.

From the above description of embodiments, it will be appreciated that such embodiments use a decode modifier instruction to modify the behaviour of at least one subsequent scalar instruction. In particular, when the decoder encounters such a decode modifier instruction, it interprets the subsequent scalar instruction as a vector instruction so as to create a vector operation from the scalar instruction, but having regard to the scalar semantics of the scalar instruction. Such an approach provides a particularly efficient mechanism for supporting both scalar operations and vector operations within a data processing apparatus operating in accordance with fixed size instructions. In particular, the scalar instructions can be retained "as is", but with many different variants of vector operation being derivable from those scalar instructions where those scalar instructions are preceded by a decode modifier instruction.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. A data processing apparatus comprising:
processing circuitry configured to perform operations;
a scalar register bank configured to store scalar operands for access by the processing circuitry;
a vector register bank configured to store vector operands for access by the processing circuitry, each vector operand comprising a plurality of operand elements;
decoding circuitry configured to decode a sequence of instructions in order to generate control signals for the processing circuitry, such that the operations performed by the processing circuitry are dictated by the sequence of instructions;
said sequence of instructions including scalar instructions, each scalar instruction specifying a scalar operation to be performed on one or more scalar operands in said scalar register bank;
the decoding circuitry being responsive to a decode modifier instruction within said sequence of instructions, the decode modifier instruction having a type identifier, to alter decoding of a subsequent scalar instruction in said sequence by:
mapping at least one scalar operand specified by said subsequent scalar instruction to at least one vector operand in said vector register bank; and
determining, in dependence on said scalar operation specified by said subsequent scalar instruction and on said type identifier of the decode modifier instruction, a vector operation to be performed by the processing circuitry upon at least a subset of the operand elements within said at least one vector operand.

2. A data processing apparatus as claimed in claim 1, wherein said vector operation is within one class of a plurality of classes of operation, the decoding circuitry determining said one class from said scalar operation.

3. A data processing apparatus as claimed in claim 2, wherein said plurality of classes of operation comprise at least add operations, multiply operations, subtract operations, logical operations, load operations and store operations.

4. A data processing apparatus as claimed in claim 1, wherein the decoding circuitry, upon altering the decoding of said subsequent scalar instruction, issues control signals to the processing circuitry to cause said vector operation to be performed at least partly in parallel upon said at least a subset of the operand elements within said at least one vector operand.

5. A data processing apparatus as claimed in claim 1, wherein the decoding circuitry, upon altering the decoding of said subsequent scalar instruction, issues control signals to the processing circuitry to cause said vector operation to be performed at least partly sequentially upon said at least a subset of the operand elements within said at least one vector operand.

6. A data processing apparatus as claimed in claim 1, wherein:
the decode modifier instruction identifies a condition to be met in order for the vector operation to be performed; and
said condition is evaluated independently for each of the operand elements upon which the vector operation is to be performed.

7. A data processing apparatus as claimed in claim 1, wherein said decode modifier instruction includes a control field for identifying control information referenced by the decoding circuitry when decoding said subsequent scalar instruction.

8. A data processing apparatus as claimed in claim 7, further comprising:
a plurality of control registers for storing control values; and
said control field of the decode modifier instruction identifies at least one of said control registers to be referenced by the decoding circuitry when decoding said subsequent scalar instruction.

9. A data processing apparatus as claimed in claim 1, wherein said decode modifier instruction includes a vector identifier field for identifying which of the scalar operands specified by said subsequent scalar instruction are to be mapped to vector operands in said vector register bank.

10. A data processing apparatus as claimed in claim 1, wherein:
said scalar register bank comprises a plurality of scalar registers having corresponding scalar register identifiers, and said vector register bank comprises a plurality of vector registers having corresponding vector register identifiers;

said subsequent scalar instruction specifies said at least one scalar operand by identifying at least one scalar register identifier; and the decoding circuitry converts said at least one scalar register identifier to a corresponding at least one vector register identifier in order to map said at least one scalar operand to said at least one vector operand.

11. A data processing apparatus as claimed in claim 1, wherein the decoding circuitry is responsive to said decode modifier instruction to alter decoding of a plurality of subsequent scalar instructions in said sequence.

12. A data processing apparatus as claimed in claim 1, wherein the decoding circuitry, upon altering the decoding of said subsequent scalar instruction, issues control signals to the processing circuitry to cause said vector operation to be performed at least partly sequentially upon said at least a subset of the operand elements within said at least one vector operand, wherein the vector operation is performed in N sequential iterations, further comprising:

an iteration count register to store a current iteration count;

the current iteration count being adjusted to keep track of each sequential iteration performed until all N sequential iterations have been performed.

13. A data processing apparatus as claimed in claim 12, wherein on occurrence of an exception during performance of said vector operation, said iteration count register is accessible to an exception handler.

14. A data processing apparatus as claimed in claim 12, wherein the decoding circuitry is configured to issue a series of control signal sets, each control signal set being associated with one iteration of said N sequential iterations, the decoding circuitry being arranged to update the iteration count register in association with each control signal set being issued.

15. A data processing apparatus as claimed in claim 12, wherein the processing circuitry includes iteration control circuitry and is configured to be responsive to a single set of control signals issued by the decoding circuitry to perform each iteration of said N iterations, and to update said iteration count register as each iteration is performed.

16. A data processing apparatus as claimed in claim 15, wherein:

the processing circuitry comprises a plurality of processing units, each processing unit having associated therewith a corresponding iteration count register;

the processing circuitry being configured to perform a first vector operation within a first processing unit of said plurality, whilst performing a second vector operation within a second processing unit of said plurality at least partly in parallel with the performance of said first vector operation.

17. A data processing apparatus as claimed in claim 16, further comprising at least one forwarding path between the first processing unit and the second processing unit to support chaining when one or more data dependencies exist between the first vector operation and the second vector operation.

18. A data processing apparatus as claimed in claim 1, further comprising:

a decode modifier register;

the decoding circuitry being responsive to said decode modifier instruction to set said decode modifier register; and the decoding circuitry being responsive to said decode modifier register being set to alter decoding of said subsequent scalar instruction.

19. A data processing apparatus as claimed in claim 18, wherein the decoding circuitry is arranged, following the altered decoding of said subsequent scalar instruction, to clear the decode modifier register.

20. A data processing apparatus as claimed in claim 1, wherein:

said subsequent scalar instruction is a conditional scalar instruction specifying a condition to be met in order for the scalar instruction to be executed; and said condition is evaluated independently for each of the operand elements upon which the vector operation is to be performed.

21. A computer program product storing in a non-transitory form a computer program for controlling a computer to provide a virtual machine execution environment for program instructions corresponding to a data processing apparatus as claimed in claim 1.

22. A data processing apparatus as claimed in claim 1, wherein the type identifier specifies a vector data flow pattern applied when performing said vector operation on said at least a subset of the operand elements within said at least one vector operand.

23. A data processing apparatus as claimed in claim 3, wherein said type identifier is used by the decoding circuitry to identify as said vector operation a particular instance of vector operation from within said one class.

24. A method of performing vector operations within a data processing apparatus having processing circuitry configured to perform operations, a scalar register bank configured to store scalar operands for access by the processing circuitry, and a vector register bank configured to store vector operands for access by the processing circuitry, each vector operand comprising a plurality of operand elements, the method comprising the steps of:

decoding a sequence of instructions in order to generate control signals for the processing circuitry, such that the operations performed by the processing circuitry are dictated by the sequence of instructions, said sequence of instructions including scalar instructions, each scalar instruction specifying a scalar operation to be performed on one or more scalar operands in said scalar register bank;

during said decoding step, in response to a decode modifier instruction within said sequence of instructions, the decode modifier instruction having a type identifier, altering decoding of a subsequent scalar instruction in said sequence by:

mapping at least one scalar operand specified by said subsequent scalar instruction to at least one vector operand in said vector register bank; and determining, in dependence on said scalar operation specified by said subsequent scalar instruction and on said type identifier of the decode modifier instruction, a vector operation to be performed by the processing circuitry upon at least a subset of the operand elements within said at least one vector operand.

25. A data processing apparatus comprising:

means for performing operations;

means for storing scalar operands for access by the means for performing;

means for storing vector operands for access by the means for performing, each vector operand comprising a plurality of operand elements;

means for decoding a sequence of instructions in order to generate control signals for the means for performing, such that the operations performed by the means for performing are dictated by the sequence of instructions;

said sequence of instructions including scalar instructions, each scalar instruction specifying a scalar operation to be performed on one or more scalar operands in said means for storing scalar operands;

the means for decoding, responsive to a decode modifier instruction within said sequence of instructions, the decode modifier instruction having a type identifier, for altering decoding of a subsequent scalar instruction in said sequence by:

mapping at least one scalar operand specified by said subsequent scalar instruction to at least one vector operand in said means for storing vector operands; and determining, in dependence on said scalar operation specified by said subsequent scalar instruction and on said type identifier of the decode modifier instruction, a vector operation to be performed by the means for performing upon at least a subset of the operand elements within said at least one vector operand.

\* \* \* \* \*